(12) United States Patent
Lyu et al.

(10) Patent No.: US 11,044,745 B2
(45) Date of Patent: Jun. 22, 2021

(54) WIRELESS COMMUNICATION METHOD AND DEVICE TO REDUCE RECEIVING PERFORMANCE LOSS FROM RESOURCE ALLOCATION

(71) Applicant: Huawei Technologies Co., Ltd., Shenzhen (CN)

(72) Inventors: Yongxia Lyu, Ottawa (CA); Ruixiang Ma, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 69 days.

(21) Appl. No.: 16/366,938

(22) Filed: Mar. 27, 2019

(65) Prior Publication Data

US 2019/0223210 A1    Jul. 18, 2019

Related U.S. Application Data

(63) Continuation of application No. PCT/CN2017/103558, filed on Sep. 27, 2017.

(30) Foreign Application Priority Data

Sep. 30, 2016 (CN) .......................... 201610877877.8

(51) Int. Cl.
*H04W 72/12* (2009.01)
*H04W 72/04* (2009.01)
(Continued)

(52) U.S. Cl.
CPC ....... *H04W 72/1289* (2013.01); *H04L 5/0007* (2013.01); *H04W 72/042* (2013.01);
(Continued)

(58) Field of Classification Search
CPC ........... H04W 72/1289; H04W 72/042; H04W 76/27; H04W 72/044; H04W 72/12;
(Continued)

(56) References Cited

U.S. PATENT DOCUMENTS 9,241,328 B2    1/2016 Yang et al.
9,548,845 B2 *  1/2017 Yi .......................... H04L 5/0053
(Continued)

FOREIGN PATENT DOCUMENTS

CN    101784116 A    7/2010
CN    101803261 A    8/2010
(Continued)

OTHER PUBLICATIONS

ZTE Microelectronics, Multiplexing of eMBB and URLLC [online], 3GPP TSG-RAN WG1#86 R1-166408, Aug. 26, 2016, total 10 pages.
(Continued)

*Primary Examiner* — Mounir Moutaouakil
(74) *Attorney, Agent, or Firm* — Slater Matsil, LLP

(57) ABSTRACT

Embodiments of this application disclose a wireless communication method, a network device, and a terminal device, to reduce receiving performance loss of a terminal device that is caused by resource reallocation. The method includes: sending, by the network device, a physical downlink control channel, where the PDCCH indicates one or more time-frequency resources scheduled by the network device; reallocating, by the network device, at least one of the time-frequency resource; and sending, by the network device, at least one piece of posterior resource indication information, where the at least one piece of posterior resource indication information indicates the reallocated time-frequency resource in the time-frequency resources.

20 Claims, 10 Drawing Sheets

(51) Int. Cl.
*H04W 76/27* (2018.01)
*H04L 5/00* (2006.01)
*H04W 88/02* (2009.01)

(52) U.S. Cl.
CPC ......... *H04W 72/044* (2013.01); *H04W 76/27* (2018.02); *H04W 72/12* (2013.01); *H04W 88/02* (2013.01)

(58) Field of Classification Search
CPC ............. H04W 88/02; H04W 72/0446; H04W 72/0453; H04W 72/1273; H04L 5/0007
See application file for complete search history.

(56) References Cited

U.S. PATENT DOCUMENTS

| | | | |
|---|---|---|---|
| 10,455,565 B2 * | 10/2019 | You | H04L 5/0094 |
| 10,637,630 B2 * | 4/2020 | Park | H04L 5/0035 |
| 10,750,530 B2 * | 8/2020 | Hu | H04W 72/1289 |
| 2009/0073958 A1 | 3/2009 | Xu | |
| 2010/0195583 A1 | 8/2010 | Nory et al. | |
| 2014/0086197 A1 | 3/2014 | Yang et al. | |
| 2016/0057773 A1 | 2/2016 | Quan et al. | |
| 2018/0146457 A1 | 5/2018 | Shimezawa et al. | |
| 2019/0082433 A1 | 3/2019 | Tang et al. | |

FOREIGN PATENT DOCUMENTS

| | | |
|---|---|---|
| CN | 102123399 A | 7/2011 |
| CN | 105453679 A | 3/2016 |
| KR | 20140072834 A | 6/2014 |
| WO | 2013055159 A2 | 4/2013 |
| WO | 2014069598 A1 | 5/2014 |
| WO | 2016056876 A1 | 4/2016 |
| WO | 2016126398 A1 | 8/2016 |
| WO | 2018028456 A1 | 2/2018 |

OTHER PUBLICATIONS

QUALCOMM Incorporated, "Mechanisms for Efficient Operation for MUST," 3GPP TSG RAN WG1 #86, R1-166278, Aug. 22-26, 2016, 7 pages, Gothenburg, Sweden.

* cited by examiner

WIRELESS COMMUNICATION METHOD AND DEVICE TO REDUCE RECEIVING PERFORMANCE LOSS FROM RESOURCE ALLOCATION

CROSS-REFERENCE TO RELATED APPLICATIONS

This application is a continuation of International Application No. PCT/CN2017/103558, filed on Sep. 27, 2017, which claims priority to Chinese Patent Application No. 201610877877.8, filed on Sep. 30, 2016, The disclosures of the aforementioned applications are hereby incorporated by reference in their entireties

TECHNICAL FIELD

Embodiments of this application relate to the communications field, and more specifically, to a wireless communication method, a network device, and a terminal device.

BACKGROUND

Currently, according to requirements of the International Telecommunication Union (ITU) for a future communications system, an air interface in the future communications system needs to support various services, for example, an enhanced mobile broadband (eMBB) service, an ultra-reliable and low latency communications (URLLC) service, and a massive machine-type communication (MTC) service.

The foregoing different services have different requirements for a communications system. Some services have a relatively high delay requirement, and some services have a relatively low delay requirement. A network device in a Long Term Evolution (LTE) system may send a downlink control channel to a terminal device to schedule the terminal device to receive a downlink message of a current service of the terminal device on one or more time-frequency resources indicated by the downlink control channel.

To meet a transmission requirement of the service with a relatively high delay requirement, the following solution may be considered. After a network device schedules, to receive a message, a terminal device whose current service has a relatively low delay requirement, the network device allocates, to a terminal device whose service has a relatively high delay requirement, one or more time-frequency resources allocated, based on a downlink control channel, to the terminal device whose service has a relatively low delay requirement.

However, in this solution, the terminal device whose service has a relatively low delay requirement still receives data on the reallocated time-frequency resource (for example, demodulates or decodes data on the reallocated time-frequency resource), thereby causing performance loss.

SUMMARY

Embodiments of this application provide a wireless communication method, a network device, and a terminal device, to reduce receiving performance loss of a terminal device that is caused by resource reallocation.

According to a first aspect, a wireless communication method is provided. The method includes: sending, by a network device, a physical downlink control channel (PDCCH). The PDCCH indicates one or more time-frequency resources scheduled by the network device. The method further includes reallocating, by the network device, at least one of the time-frequency resources. The method includes sending, by the network device, at least one piece of posterior resource indication information. The at least one piece of posterior resource indication information indicates the reallocated at least one of the time-frequency resources.

The network device may send a physical downlink control channel (PDCCH) to each terminal device scheduled in a current scheduling period. The PDCCH may carry one or more time-frequency resources allocated to each terminal device scheduled in the current scheduling period. The network device may indicate, by sending at least one piece of posterior resource indication information to some or all of the terminal devices scheduled in the current scheduling period, at least one reallocated time-frequency resource in the time-frequency resources scheduled by the PDCCH. Then, based on the PDCCH and the at least one piece of posterior resource indication information, the terminal device may determine whether there is at least one reallocated time-frequency resource in the time-frequency resources allocated by the network device to the terminal device in the current scheduling period, and determine the at least one reallocated time-frequency resource in the time-frequency resources allocated to the terminal device in the current scheduling period. In this way, the terminal device may receive (for example, decode or demodulate) only data carried on at least one time-frequency resource that is not reallocated in the time-frequency resources allocated to the terminal device, and does not receive (for example, does not decode or does not demodulate) data carried on the reallocated time-frequency resource in the time-frequency resources allocated to the terminal device, to correctly receive downlink data. Therefore, receiving performance loss of the terminal device that is caused by resource reallocation can be reduced by using the wireless communication method in this embodiment of this application.

In a possible implementation, the time-frequency resource corresponds to at least one time domain scheduling unit in time domain, and each time domain scheduling unit includes at least one mini-slot, or each time domain scheduling unit includes at least one symbol.

The time domain scheduling unit may be specified in a standard. Alternatively, the time domain scheduling unit may be configured by the network device by using a system message, a broadcast message, or higher layer signaling.

Optionally, the symbol may be an orthogonal frequency division multiplexing (OFDM) symbol, or may be a single carrier frequency division multiple access (SC-FDMA) symbol.

In a possible implementation, the at least one piece of posterior resource indication information includes at least one piece of common posterior resource indication information. The at least one time domain scheduling unit is in a one-to-one correspondence with the at least one piece of common posterior resource indication information. An $I^{th}$ piece of common posterior resource indication information in the at least one piece of common posterior resource indication information is received by some or all of terminal devices scheduled in a time domain scheduling unit corresponding to the $I^{th}$ piece of common posterior resource indication information. Each piece of common posterior resource indication information indicates at least one reallocated time-frequency resource in a corresponding time domain scheduling unit, $I \in [1, X]$, and X is a quantity of pieces of common posterior resource indication information.

The some terminal devices may be terminal devices whose used time-frequency resources may be reallocated.

In this embodiment of this application, all the terminal devices scheduled in the current scheduling period may receive the at least one piece of posterior resource indication information, or only a terminal device that is in all the terminal devices scheduled in the current scheduling period and whose time-frequency resource may be reallocated receives the at least one piece of posterior resource indication information.

In the wireless communication method in this embodiment of this application, by detecting common posterior resource indication information corresponding to a time domain scheduling unit to which one or more time-frequency resources allocated to the terminal device belongs. The terminal device may determine whether there is at least one reallocated time-frequency resource in the time-frequency resources allocated to the terminal device, and determine the at least one reallocated time-frequency resource in the time-frequency resources allocated to the terminal device. In this way, the terminal device may receive (for example, decode or demodulate) only data carried on at least one time-frequency resource that is not reallocated in the time-frequency resources allocated to the terminal device, and does not receive (for example, does not decode or does not demodulate) data carried on the at least one reallocated time-frequency resource in the time-frequency resources allocated to the terminal device, to correctly receive downlink data. Therefore, receiving performance loss of the terminal device that is caused by resource reallocation can be reduced by using the wireless communication method in this embodiment of this application.

In a possible implementation, a quantity of resource elements (RE) occupied by each piece of common posterior resource indication information is fixed. For example, an encoding rate is fixed.

In a possible implementation, each piece of common posterior resource indication information is evenly distributed in an entire frequency band of the time-frequency resource in frequency domain.

In a possible implementation, each time domain scheduling unit includes a common time-frequency resource, a common time-frequency resource in an $i^{th}$ time domain scheduling unit is received by some or all of terminal devices scheduled in the $i^{th}$ time domain scheduling unit, $i \in [1, N]$, and N is a quantity of time domain scheduling units included in the time-frequency resource in time domain.

In a possible implementation, each time domain scheduling unit corresponds to q frequency bands in frequency domain, each piece of common posterior resource indication information includes q bit groups. The q frequency bands are in a one-to-one correspondence with the q bit groups, and each bit group includes k−y bits. For a bit group Zj corresponding to a frequency band Fj, k−y bits in the bit group Zj are in a one-to-one correspondence with k−y mini-slots or symbols corresponding to the frequency band Fj. Bit values of the bits in the bit group Zj are used to indicate whether the last k−y mini-slots or the last k−y symbols in a time domain scheduling unit corresponding to the frequency band Fj are reallocated, where $k \geq 1$, $q \geq 1$, $k > y \geq 0$, $j \in [1, k]$, and k is a quantity of mini-slots or symbols included in the time domain scheduling unit.

In a possible implementation, each piece of common posterior resource indication information is carried on the last M symbols in the corresponding time domain scheduling unit in time domain, and $M \geq 1$.

In a possible implementation, a time-frequency resource used to carry the at least one piece of posterior resource indication information is a reserved resource specified by a system.

In a possible implementation, the at least one piece of posterior resource indication information includes at least one piece of dedicated posterior resource indication information. The at least one piece of dedicated posterior resource indication information is in a one-to-one correspondence with at least one terminal device, the at least one terminal device belongs to terminal devices scheduled by the PDCCH. A $J^{th}$ piece of dedicated posterior resource indication information in the at least one piece of dedicated posterior resource indication information indicates at least one reallocated time-frequency resource in time-frequency resources allocated to a terminal device corresponding to the $J^{th}$ piece of dedicated posterior resource indication information, $J \in [1, Y]$, and Y is a quantity of terminal devices.

Optionally, a quantity of resource elements (RE) occupied by the $J^{th}$ piece of dedicated posterior resource indication information is fixed.

Optionally, the $j^{th}$ piece of dedicated posterior resource indication information is evenly distributed in an entire frequency band of the time-frequency resource in frequency domain.

In the wireless communication method in this embodiment of this application, by detecting the dedicated posterior resource indication information of the terminal device. The terminal device whose time-frequency resources indicated by the PDCCH includes at least one reallocated time-frequency resource may determine whether there is at least one reallocated time-frequency resource in the time-frequency resources allocated to the terminal device, and determine the at least one reallocated time-frequency resource in the time-frequency resources allocated to the terminal device. In this way, the terminal device may receive (for example, decode or demodulate) only data carried on at least one time-frequency resource that is not reallocated, and does not receive (for example, does not decode or does not demodulate) data carried on the at least one reallocated time-frequency resource, to correctly receive downlink data. Therefore, receiving performance loss of the terminal device that is caused by resource reallocation can be reduced by using the wireless communication method in this embodiment of this application.

In a possible implementation, each piece of dedicated posterior resource indication information is carried on the last N symbols that are allocated to a corresponding terminal device and that are indicated by the PDCCH, and $N \geq 1$.

In a possible implementation, a time-frequency resource used to carry the at least one piece of posterior resource indication information is a time-frequency resource that is prohibited from being reallocated.

In a possible implementation, the at least one piece of posterior resource indication information includes at least one piece of dedicated posterior resource indication information, the at least one piece of dedicated posterior resource indication information is in a one-to-one correspondence with at least one terminal device, the at least one terminal device belongs to terminal devices scheduled by the PDCCH. A $J^{th}$ piece of dedicated posterior resource indication information in the at least one piece of dedicated posterior resource indication information indicates a reallocated time-frequency resource in a time-frequency resource allocated to a terminal device corresponding to the $J^{th}$ piece of dedicated posterior resource indication information. $J \in [1, Y]$, and Y is a quantity of terminal devices.

In a possible implementation, the time-frequency resource allocated to the terminal device corresponding to the $J^{th}$ piece of dedicated posterior resource indication information corresponds to z frequency bands in frequency domain, the $J^{th}$ piece of dedicated posterior resource indication information includes z bit groups, the z frequency bands are in a one-to-one correspondence with the z bit groups, and each bit group includes p−s bits. For a bit group Ur corresponding to a frequency band Dr, p−s bits in the bit group Ur are in a one-to-one correspondence with p−s mini-slots or symbols corresponding to the frequency band Dr. Bit values of the bits in the bit group Ur are used to indicate whether the last p−s mini-slots or symbols, in time domain, of the time-frequency resources that are allocated to the terminal device corresponding to the $J^{th}$ piece of dedicated posterior resource indication information and that correspond to the frequency band Dr are reallocated, where s≥0, p≥1, z≥1, p>s, r∈[1, p], and p is a quantity of mini-slots or symbols included, in time domain, in the time-frequency resources allocated to the terminal device corresponding to the $J^{th}$ piece of dedicated posterior resource indication information.

In a possible implementation, the sending, by the network device, at least one piece of posterior resource indication information includes: sending, by the network device by using the time-frequency resources allocated to the terminal device corresponding to the $j^{th}$ piece of dedicated posterior resource indication information, the $J^{th}$ piece of dedicated posterior resource indication information to the terminal device corresponding to the $J^{th}$ piece of dedicated posterior resource indication information.

In a possible implementation, a quantity of REs occupied by each piece of dedicated posterior resource indication information is not fixed.

In a possible implementation, when a bandwidth included in the time-frequency resource allocated to the terminal device corresponding to the $j^{th}$ piece of dedicated posterior resource indication information is less than g subcarriers, the $j^{th}$ piece of dedicated posterior resource indication information occupies the last two symbols in the bandwidth included in the time-frequency resources allocated to the terminal device corresponding to the $j^{th}$ piece of dedicated posterior resource indication information, where g≥1.

In a possible implementation, according to a direction from a last symbol to a second last symbol in the bandwidth included in the time-frequency resource allocated to the terminal device corresponding to the $J^{th}$ piece of dedicated posterior resource indication information, the $J^{th}$ piece of dedicated posterior resource indication information is arranged in a direction from a subcarrier with a minimum serial number to a subcarrier with a maximum serial number on the last symbol in the bandwidth included in the time-frequency resource, or the $J^{th}$ piece of dedicated posterior resource indication information is arranged in a direction from a subcarrier with a maximum serial number to a subcarrier with a minimum serial number on the last symbol in the bandwidth included in the time-frequency resource.

In a possible implementation, before the sending, by a network device, a physical downlink control channel, the method further includes: sending, by the network device, indication signaling, where the indication signaling indicates at least one frequency domain resource that can be reallocated in the time-frequency resources, or the indication signaling indicates whether the terminal device needs to receive the at least one piece of posterior resource indication information.

In a possible implementation, the indication signaling includes a downlink resource block allocation field, where the downlink resource block allocation field indicates a start location and an end location of at least one resource block that can be reallocated, or the downlink resource block allocation field indicates a start location and a quantity of at least one resource block that can be reallocated.

In a possible implementation, the sending, by the network device, indication signaling includes: sending, by the network device, system information or Radio Resource Control (RRC) layer signaling, where the system information carries the indication signaling, or the RRC layer signaling carries the indication signaling.

In a possible implementation, the indication signaling indicates whether all frequency domain resources of a carrier can be reallocated.

Optionally, the indication signaling includes a first bit, and the first bit indicates whether all the frequency domain resources of the carrier can be reallocated.

In a possible implementation, the sending, by the network device, indication signaling includes: sending, by the network device, system information or a broadcast channel, where the system information carries the indication signaling, or the broadcast channel carries the indication signaling.

In a possible implementation, the indication signaling indicates whether the terminal device needs to receive the at least one piece of posterior resource indication information, and the sending, by the network device, the at least one piece of posterior resource indication information includes: sending, by the network device, the at least one piece of posterior resource indication information when the terminal device determines, based on the indication signaling, to receive the at least one piece of posterior resource indication information.

In a possible implementation, the PDCCH is further used to indicate whether the terminal device needs to receive the at least one piece of posterior resource indication information. Before the sending, by the network device, the at least one piece of posterior resource indication information, the method includes: sending, by the network device, the at least one piece of posterior resource indication information when the terminal device determines, based on the PDCCH, to receive the at least one piece of posterior resource indication information.

According to a second aspect, a wireless communication method is provided. The method includes: receiving, by a terminal device, a first physical downlink control channel (PDCCH) sent by a network device. The first PDCCH indicates one or more first time-frequency resources scheduled by the network device for the terminal device. The method includes receiving, by the terminal device, at least one piece of first posterior resource indication information sent by the network device. The at least one piece of first posterior resource indication information indicates at least one reallocated time-frequency resource in the first time-frequency resources. The method further includes receiving, by the terminal device based on the PDCCH and the at least one piece of first posterior resource indication information, downlink data sent by the network device to the terminal device.

In this embodiment of this application, the terminal device may be a terminal device whose used time-frequency resource may be reallocated.

For any one of the terminal devices, the terminal device may determine, by receiving a PDCCH (which is referred to as the first PDCCH) that is for the terminal device and that is in the PDCCH sent by the network device, one or more time-frequency resources (namely, the first time-frequency resources) allocated to the terminal device. Based on the first PDCCH and the at least one piece of first posterior resource indication information that are sent by the network device, the terminal device may determine whether there is at least one reallocated time-frequency resource in the first time-frequency resources, and determine the reallocated time-frequency resource in the first time-frequency resources. In this way, the terminal device may receive (for example, decode or demodulate) only data carried on at least one time-frequency resource that is not reallocated, and does not receive (for example, does not decode or does not demodulate) data carried on the reallocated time-frequency resource, to correctly receive the downlink data. Therefore, receiving performance loss of the terminal device that is caused by resource reallocation can be reduced by using the wireless communication method in this embodiment of this application.

In a possible implementation, the first time-frequency resources corresponds to at least one time domain scheduling unit in time domain, and each time domain scheduling unit includes at least one mini-slot, or each time domain scheduling unit includes at least one symbol.

The time domain scheduling unit may be specified in a standard. Alternatively, the time domain scheduling unit may be configured by the network device by using a system message, a broadcast message, or higher layer signaling.

Optionally, the symbol may be an OFDM symbol, or may be an SC-FDMA symbol.

In a possible implementation, the at least one piece of first posterior resource indication information includes at least one piece of common posterior resource indication information, the at least one time domain scheduling unit is in a one-to-one correspondence with the at least one piece of common posterior resource indication information, an $I^{th}$ piece of common posterior resource indication information in the at least one piece of common posterior resource indication information is received by some or all of terminal devices scheduled in a time domain scheduling unit corresponding to the $I^{th}$ piece of common posterior resource indication information. Each piece of common posterior resource indication information indicates a reallocated time-frequency resource in a corresponding time domain scheduling unit, $I \in [1, x]$, and x is a quantity of pieces of common posterior resource indication information.

In the wireless communication method in this embodiment of this application, by detecting common posterior resource indication information corresponding to a time domain scheduling unit to which the first time-frequency resources belong, the terminal device may determine whether there is at least one reallocated time-frequency resource in the first time-frequency resources, and determine the reallocated time-frequency resource in the first time-frequency resources. In this way, the terminal device may receive (for example, decode or demodulate) only data carried on a time-frequency resource that is not reallocated, and does not receive (for example, does not decode or does not demodulate) data carried on the reallocated time-frequency resource, to correctly receive the downlink data. Therefore, receiving performance loss of the terminal device that is caused by resource reallocation can be reduced by using the wireless communication method in this embodiment of this application.

In a possible implementation, a quantity of resource elements (RE) occupied by each piece of common posterior resource indication information is fixed. For example, an encoding rate is fixed.

In a possible implementation, each piece of common posterior resource indication information is evenly distributed in an entire frequency band of the time-frequency resource in frequency domain.

In a possible implementation, each time domain scheduling unit includes a common time-frequency resource, a common time-frequency resource in an $i^{th}$ time domain scheduling unit is received by some or all of terminal devices scheduled in the $i^{th}$ time domain scheduling unit, $i \in [1, N]$, and N is a quantity of time domain scheduling units included in the time-frequency resource in time domain.

In a possible implementation, each time domain scheduling unit corresponds to q frequency bands in frequency domain, each piece of common posterior resource indication information includes q bit groups, the q frequency bands are in a one-to-one correspondence with the q bit groups, and each bit group includes k–y bits. For a bit group Zj corresponding to a frequency band Fj, k–y bits in the bit group Zj are in a one-to-one correspondence with k–y mini-slots or symbols corresponding to the frequency band Fj. Bit values of the bits in the bit group Zj are used to indicate whether the last k–y mini-slots or the last k–y symbols in a time domain scheduling unit corresponding to the frequency band Fj are reallocated, where k≥1, q≥1, k>y≥0, j∈[1, k], and k is a quantity of mini-slots or symbols included in the time domain scheduling unit.

In a possible implementation, each piece of common posterior resource indication information is carried on the last M symbols in the corresponding time domain scheduling unit in time domain, and M≥1.

In a possible implementation, a time-frequency resource used to carry the at least one piece of first posterior resource indication information is a reserved resource specified by a system.

In a possible implementation, the first posterior resource indication information is specifically first dedicated posterior resource indication information, and the first dedicated posterior resource indication information indicates the reallocated time-frequency resource in the time-frequency resource allocated to the terminal device; and the receiving, by the terminal device based on the PDCCH and the at least one piece of first posterior resource indication information, downlink data sent by the network device to the terminal device includes: skipping demodulating or decoding, by the terminal device based on the PDCCH and the first dedicated posterior resource indication information, data carried on the reallocated time-frequency resource.

Optionally, a quantity of resource elements (RE) occupied by the first dedicated posterior resource indication information is fixed.

Optionally, the first dedicated posterior resource indication information is evenly distributed in an entire frequency band of the time-frequency resource in frequency domain.

In the wireless communication method in this embodiment of this application, by detecting the first dedicated posterior resource indication information, the terminal device may determine whether there is at least one reallocated time-frequency resource in the first time-frequency resources, and determine the reallocated time-frequency resource in the first time-frequency resources. In this way, the terminal device may receive (for example, decode or demodulate) only data carried on at least one time-frequency resource that is not reallocated, and does not receive (for example, does not decode or does not demodulate) data carried on the reallocated time-frequency resource, to correctly receive the downlink data. Therefore, receiving performance loss of the terminal device that is caused by resource reallocation can be reduced by using the wireless communication method in this embodiment of this application.

In a possible implementation, the first dedicated posterior resource indication information is carried on the last N symbols of the first time-frequency resource, and N≥1.

In a possible implementation, a time-frequency resource used to carry the first dedicated posterior resource indication information is a time-frequency resource that is prohibited from being reallocated.

In a possible implementation, the first time-frequency resources corresponds to z frequency bands in frequency domain, the first dedicated posterior resource indication information includes z bit groups, the z frequency bands are in a one-to-one correspondence with the z bit groups, and each bit group includes p−s bits. For a bit group Ur corresponding to a frequency band Dr, p−s bits in the bit group Ur are in a one-to-one correspondence with p−s mini-slots or symbols corresponding to the frequency band Dr. Bit values of the bits in the bit group Ur are used to indicate whether the last p−s mini-slots or symbols, in time domain, of the first time-frequency resource corresponding to the frequency band Dr are reallocated, where s≥0, p≥1, z≥1, p>s, r∈[1, p], and p is a quantity of mini-slots or symbols included in the first time-frequency resource in time domain.

In a possible implementation, a quantity of REs occupied by the first dedicated posterior resource indication information is not fixed.

In a possible implementation, when a bandwidth included in the first time-frequency resources is less than g subcarriers, the first dedicated posterior resource indication information occupies the last two symbols in the bandwidth included in the first time-frequency resource, where g>1.

In a possible implementation, according to a direction from a last symbol to a second last symbol in the bandwidth included in the first time-frequency resources, the first dedicated posterior resource indication information is arranged in a direction from a subcarrier with a minimum serial number to a subcarrier with a maximum serial number on the last symbol in the bandwidth included in the first time-frequency resources, or the first dedicated posterior resource indication information is arranged in a direction from a subcarrier with a maximum serial number to a subcarrier with a minimum serial number on the last symbol in the bandwidth included in the first time-frequency resource.

In a possible implementation, before the terminal device receives the first PDCCH, the method further includes: receiving, by the terminal device, indication signaling sent by the network device, where the indication signaling indicates at least one frequency domain resource that can be reallocated, or the indication signaling indicates whether the terminal device needs to receive the at least one piece of first posterior resource indication information.

In a possible implementation, the indication signaling includes a downlink resource block allocation field, where the downlink resource block allocation field indicates a start location and an end location of at least one resource block that can be reallocated, or the downlink resource block allocation field indicates a start location and a quantity of at least one resource block that can be reallocated.

In a possible implementation, the receiving, by the terminal device, indication signaling sent by the network device includes: receiving, by the terminal device, system information or RRC layer signaling sent by the network device, where the system information carries the indication signaling, or the RRC layer signaling carries the indication signaling.

In a possible implementation, the indication signaling indicates whether all frequency domain resources of a carrier can be reallocated.

Optionally, the indication signaling includes a first bit, and the first bit indicates whether all the frequency domain resources of the carrier can be reallocated.

In a possible implementation, the receiving, by the terminal device, indication signaling sent by the network device includes: receiving, by the terminal device, system information or a broadcast channel sent by the network device, where the system information carries the indication signaling, or the broadcast channel carries the indication signaling.

In a possible implementation, the indication signaling indicates whether the terminal device needs to receive the at least one piece of first posterior resource indication information, and before the receiving, by the terminal device, at least one piece of first posterior resource indication information sent by the network device. The method further includes: determining, by the terminal device based on the indication signaling, to receive the at least one piece of first posterior resource indication information.

In a possible implementation, the first PDCCH is further used to indicate whether the terminal device needs to receive the at least one piece of first posterior resource indication information, and before the receiving, by the terminal device, at least one piece of first posterior resource indication information sent by the network device. The method further includes: determining, by the terminal device based on the first PDCCH, to receive the at least one piece of first posterior resource indication information.

According to a third aspect, a network device is provided. The network device includes: a sending unit, configured to send a physical downlink control channel PDCCH, where the PDCCH indicates one or more time-frequency resources scheduled by the network device; and a processing unit, configured to reallocate at least one of the time-frequency resources. The sending unit is further configured to send at least one piece of posterior resource indication information. The at least one piece of posterior resource indication information indicates the reallocated time-frequency resource in the time-frequency resource.

The network device is configured to perform the method in the first aspect or any possible implementation of the first aspect. Specifically, the network device further includes a unit configured to perform the method in the first aspect or any possible implementation of the first aspect.

According to a fourth aspect, a terminal device is provided. The terminal device includes: a receiving unit, configured to receive a first physical downlink control channel (PDCCH) sent by a network device. The first PDCCH indicates a first time-frequency resource scheduled by the network device for the terminal device, and the receiving unit is further configured to receive at least one piece of first posterior resource indication information sent by the network device. The at least one piece of first posterior resource indication information indicates a reallocated time-frequency resource in the first time-frequency resource. The terminal device further includes a processing unit, configured to control, based on the PDCCH and the at least one piece of first posterior resource indication information, the receiving unit to receive downlink data sent by the network device to the terminal device.

The terminal device is configured to perform the method in the second aspect or any possible implementation of the second aspect. Specifically, the terminal device further includes a unit configured to perform the method in the second aspect or any possible implementation of the second aspect.

According to a fifth aspect, a network device is provided, and the network device includes a processor, a memory, a transmitter, and a receiver, and is configured to implement the method in the first aspect or any possible implementation of the first aspect.

According to a sixth aspect, a terminal device is provided, and the terminal device includes a processor, a memory, a transmitter, and a receiver, and is configured to implement the method in the second aspect or any possible implementation of the second aspect.

According to a seventh aspect, this application provides a computer readable medium, configured to store a computer program, where the computer program includes an instruction for performing the method in the first aspect or any possible implementation of the first aspect.

According to an eighth aspect, a computer readable medium is provided, and is configured to store a computer program. The computer program includes an instruction for performing the method in the second aspect or any possible implementation of the second aspect.

According to a ninth aspect, a computer program product including an instruction is provided. When the computer program product runs on a computer, the computer performs the method in the first aspect or any possible implementation of the first aspect.

According to a tenth aspect, a computer program product including an instruction is provided. When the computer program product runs on a computer, the computer performs the method in the second aspect or any possible implementation of the second aspect.

DETAILED DESCRIPTION OF ILLUSTRATIVE EMBODIMENTS

The following describes the technical solutions in this application with reference to the accompanying drawings.

A terminal device in the embodiments of this application may be a device that provides a user with voice and/or data connectivity, a handheld device with a radio connection function, or another processing device connected to a wireless modem. A wireless terminal may communicate with one or more core networks through a radio access network (RAN). The wireless terminal may be a mobile terminal, such as a mobile phone (also referred to as a "cellular" phone) and a computer with a mobile terminal, for example, may be a portable, pocket-sized, handheld, computer built-in, or in-vehicle mobile apparatus, which exchanges voice and/or data with the radio access network. For example, the wireless terminal may be a device such as a personal communications service (PCS) phone, a cordless telephone set, a Session Initiation Protocol (SIP) phone, a wireless local loop (WLL) station, or a personal digital assistant (PDA). The wireless terminal may also be referred to as a system, a subscriber unit, a subscriber station, a mobile station, a mobile console (Mobile), a remote station, an access point, a remote terminal, an access terminal, a user terminal, a user agent, a user device, or user equipment.

A network device in the embodiments of this application may be a base station or an access point, or may be a device in communication with a wireless terminal via one or more sectors on an air interface in an access network. The base station may be configured to mutually convert a received over-the-air frame and an IP packet and serve as a router between the wireless terminal and a remaining portion of the access network. The remaining portion of the access network may include an Internet Protocol (IP) network. The base station may further coordinate attribute management of the air interface. For example, the base station may be a base transceiver station (BTS) in GSM or CDMA, may be a NodeB in WCDMA, or may be an evolved NodeB (eNB or e-NodeB) in LTE or a network device in a 5G network. This is not limited in this application.

A wireless communication method provided in the embodiments of this application is applicable to a terminal device, in any wireless communications system, with a relatively low delay requirement for sending a message or receiving a message, and a network device that schedules the terminal device to send a message or receive a message. The wireless communications system described herein may be, for example, an LTE communications system, a 4G communications system, or a 5G communications system.

Figure 1:
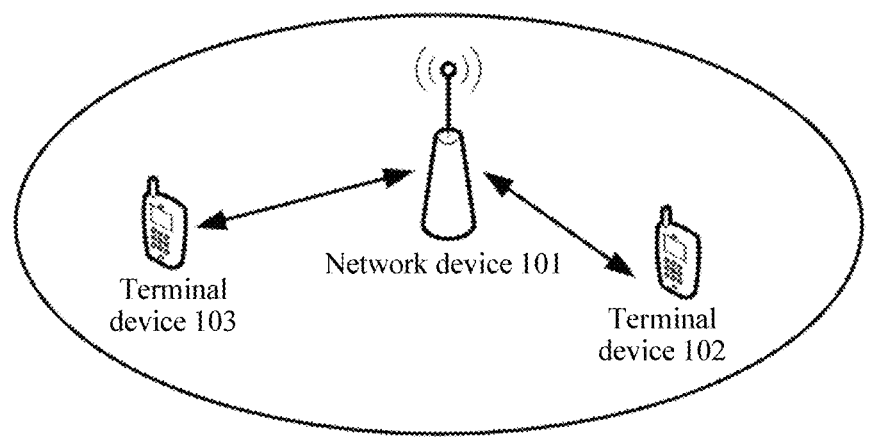
FIG. 1 is a schematic diagram of an application scenario according to an embodiment of this application.

The LTE communications system is used as an example. As shown in FIG. 1, after a network device 101 schedules, through a downlink control channel to receive downlink data sent by the network device 101, a terminal device 102 whose current service has a relatively low delay requirement, if the network device 101 needs to further schedule a terminal device 103 with a relatively high transmission delay requirement to receive the downlink data sent by the network device 101, the network device 101 may send the downlink data on one or more time-frequency resources allocated to the terminal device 102. However, when the network device 101 sends the downlink data to the terminal device 103 by using the time-frequency resources allocated to the terminal device 102, performance loss of the terminal device 102 is caused.

The wireless communication method provided in the embodiments of this application aims to resolve a prior-art problem of performance loss that is of a terminal device with a relatively low delay requirement and that is caused by resource reallocation. The following describes the technical solutions of this application in detail with reference to specific embodiments. The following specific embodiments may be mutually combined, and same or similar concepts or processes may not be repeatedly described in some embodiments.

First, related concepts in the embodiments of this application are described.

A normal terminal is a terminal device whose service has a lower transmission delay requirement than a service of an emergency terminal.

An emergency terminal is a terminal device whose service is sensitive to a transmission delay.

Figure 2:
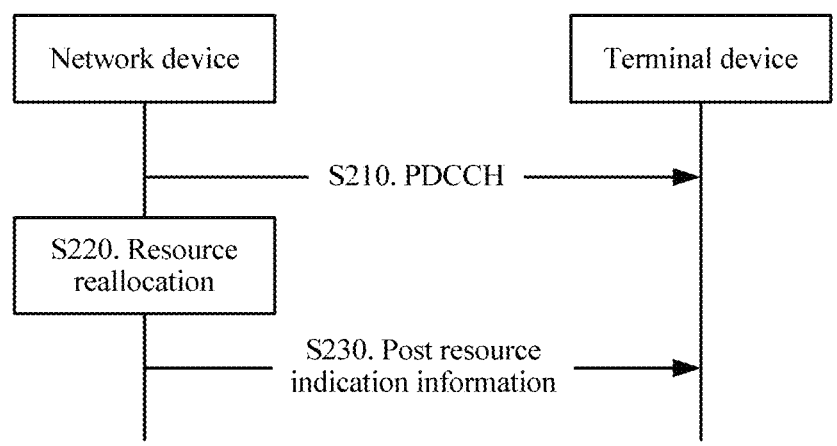
FIG. 2 is a schematic flowchart of a wireless communication method according to an embodiment of this application.

FIG. 2 is a schematic interaction diagram of a wireless communication method 200 according to an embodiment of this application. As shown in FIG. 2, the method 200 includes the following steps.

S210. A network device may send a physical downlink control channel PDCCH to each terminal device scheduled in a current scheduling period. For ease of understanding and differentiation, the foregoing terminal device scheduled in the current scheduling period is denoted as a terminal device #1 to a terminal device #N below. The terminal device #1 to the terminal device #N include a normal terminal, and N≥1.

The PDCCH may carry a time-frequency resource allocated to each of the terminal device #1 to the terminal device #N. For ease of understanding and differentiation, the time-frequency resources allocated to each of the terminal device #1 to the terminal device #N are denoted as a time-frequency resource #1 to a time-frequency resource #N below. The time-frequency resource #1 to the time-frequency resource #N are in a one-to-one correspondence with the terminal device #1 to the terminal device #N. For example, the time-frequency resource #1 may be a time-frequency resource that is indicated by the PDCCH and that is allocated to the terminal device #1, the time-frequency resource #2 may be a time-frequency resource that is indicated by the PDCCH and that is allocated to the terminal device #2, and by analogy, the time-frequency resource #N may be a time-frequency resource that is indicated by the PDCCH and that is allocated to the terminal device #N. Herein, details are omitted to avoid repetition.

S220. The network device reallocates at least one of a time-frequency resource #1 to a time-frequency resource #N. More specifically, the network device reallocates at least one time-frequency resource in the time-frequency resource #1 to the time-frequency resource #N and allocated to the normal terminal. For ease of understanding and differentiation, at least one reallocated time-frequency resource is denoted as a time-frequency resource #M below. There may be one or more time-frequency resources #M. This is not specifically limited in this application.

S230. The network device sends indication information (namely, an example of posterior resource indication information) used to indicate that a time-frequency resource #M is reallocated.

For example but not for limitation, the posterior resource indication information may be common information detected and received by a plurality of terminal devices (as shown in Case 1), or the posterior resource indication information may be dedicated information detected and received by one terminal device (as shown in Case 2). The following separately describes specific procedures in the two cases in detail.

Case 1

Optionally, the time-frequency resource corresponds to at least one time domain scheduling unit in time domain, and each time domain scheduling unit includes at least one mini-slot, or each time domain scheduling unit includes at least one symbol. A symbol in embodiments of the present invention may be an OFDM symbol or an SC-FDMA symbol.

Specifically, in this embodiment of this application, the time-frequency resources scheduled by the PDCCH may correspond to at least one time domain scheduling unit in time domain.

That "the time-frequency resources scheduled by the PDCCH may correspond to at least one time domain scheduling unit in time domain" may be understood as: The time-frequency resources scheduled by the PDCCH are located within a range of the at least one time domain scheduling unit in time domain, for example, the time-frequency resources scheduled by the PDCCH are a part of the at least one time domain scheduling unit.

Alternatively, that "the time-frequency resources scheduled by the PDCCH may correspond to at least one time domain scheduling unit in time domain" may be understood as: The time-frequency resources scheduled by the PDCCH include an entire time domain range in the at least one time domain scheduling unit in time domain.

The following first describes the time domain scheduling unit in this embodiment of this application.

Specifically, the time domain scheduling unit in this embodiment of this application may be specified in a standard.

For example, one time domain scheduling unit may include one subframe (14 symbols).

For another example, one time domain scheduling unit may include one slot (seven symbols).

For another example, one time domain scheduling unit may include one or more mini-slots.

A quantity of symbols included in the mini-slot may be less than 7.

For example but not for limitation, in this embodiment of this application, an index may be allocated to each mini-slot, and a quantity of symbols included in each mini-slot corresponds to the index of the mini-slot. For example, one time domain scheduling unit includes six mini-slots, and indexes of the six mini-slots may be sequentially 012345.

For example but not for limitation, in a time domain scheduling unit, a quantity of symbols corresponding to a mini-slot whose index is 0 may be 3, a quantity of symbols corresponding to a mini-slot whose index is 1 may be 2, a quantity of symbols corresponding to a mini-slot whose index is 2 may be 2, a quantity of symbols corresponding to a mini-slot whose index is 3 may be 3, a quantity of symbols corresponding to a mini-slot whose index is 4 may be 2, and a quantity of symbols corresponding to a mini-slot whose index is 5 may be 2. For example, in the time domain scheduling unit, the quantities of symbols included in the mini-slots may be sequentially 322322.

For another example, in a time domain scheduling unit, a quantity of symbols corresponding to a mini-slot whose index is 0 may be 2, a quantity of symbols corresponding to a mini-slot whose index is 1 may be 2, a quantity of symbols corresponding to a mini-slot whose index is 2 may be 3, a quantity of symbols corresponding to a mini-slot whose index is 3 may be 2, a quantity of symbols corresponding to a mini-slot whose index is 4 may be 2, and a quantity of symbols corresponding to a mini-slot whose index is 5 may be 3. For example, in the time domain scheduling unit, the quantities of symbols corresponding to the mini-slots may be sequentially 223223.

For another example, one time domain scheduling unit may include three mini-slots, and quantities of symbols included in the mini-slots are sequentially 322 or 223.

For another example, one time domain scheduling unit may include four mini-slots, and quantities of symbols included in the mini-slots are sequentially 4343 or 3434.

For another example, one time domain scheduling unit includes two mini-slots, and quantities of symbols included in the mini-slots are sequentially 43 or 34.

In addition, the time domain scheduling unit in this embodiment of this application may be configured by the network device by using a system message, a broadcast message, or higher layer signaling. For the time domain scheduling unit configured by the network device, refer to the foregoing description of the time domain scheduling unit specified in the standard. For brevity, details are not described herein again.

The following describes in detail a manner of sending posterior resource indication information in a structure of the time domain scheduling unit.

Optionally, a at least one piece of posterior resource indication information includes at least one piece of common posterior resource indication information. The at least one time domain scheduling unit is in a one-to-one correspondence with the at least one piece of common posterior resource indication information. An $I^{th}$ piece of common posterior resource indication information in the at least one piece of common posterior resource indication information is received by some or all of terminal devices scheduled in a time domain scheduling unit corresponding to the $I^{th}$ piece of common posterior resource indication information, each piece of common posterior resource indication information indicates at least one reallocated time-frequency resource in a corresponding time domain scheduling unit, $I \in [1, X]$, and X is a quantity of pieces of common posterior resource indication information.

Generally, it is assumed that the time-frequency resource scheduled by the PDCCH may correspond to T time domain scheduling units in time domain, and $T \geq 1$.

In this case, for any time domain scheduling unit Tα in the T time domain scheduling units, where $\alpha \in [1, T]$, if at least one reallocated time-frequency resource exists in a time range corresponding to the time domain scheduling unit Tα. For example, if a time-frequency resource that belongs to the time domain scheduling unit Tα exists in the time-frequency resource #M, the network device may send, within the time range of the time domain scheduling unit Tα. Common posterior resource indication information Hα corresponding to the time domain scheduling unit Tα. The common posterior resource indication information Hα may indicate the reallocated time-frequency resource that exists in the time range corresponding to the time domain scheduling unit Tα, or the common posterior resource indication information Hα may indicate the time-frequency resource that belongs to the time domain scheduling unit Tα and that is in the time-frequency resource #M.

It should be noted that, if all terminal devices scheduled in the time domain scheduling unit Tα are denoted as terminal devices Tα, the terminal devices Tα may include one or more first-type terminal devices. For ease of understanding and differentiation, the first-type terminal device is denoted as a terminal device Tα-1 below. The terminal device Tα-1 may be a terminal device whose used time-frequency resources may be reallocated.

For example but not for limitation, in this embodiment of this application, all the terminal devices Tα may be first-type terminal devices, and therefore all of the terminal devices Tα may detect the common posterior resource indication information Hα.

Alternatively, in this embodiment of this application, the terminal devices Tα may further include one or more second-type terminal devices. For ease of understanding and differentiation, the second-type terminal device may be denoted as a terminal device Tα-2 below. The terminal device Tα-2 may be a terminal device whose used time-frequency resources cannot be reallocated. For example, the terminal device Tα-2 may be a terminal device in which an end symbol of an allocated physical downlink shared channel (PDSCH) indicated by the PDCCH is only v symbols away from an end symbol of the PDCCH, where $v \geq 1$. For example, when a relatively small quantity of time domain resources are occupied by the PDSCH and are close to those of the PDCCH, a time-frequency resource of the PDSCH is not reallocated. For another example, the terminal device Tα-2 may be a terminal device whose bandwidth of one or more allocated frequency domain resources indicated by the PDCCH is less than a specific quantity. For example, one or more time-frequency resources allocated to a terminal device whose bandwidth is less than 48 subcarriers or 36 subcarriers are not reallocated. Therefore, the terminal device Tα-2 in the terminal devices Tα may not detect the common posterior resource indication information Hα. Therefore, the terminal device Tα-1 can determine, based on the detected common posterior resource indication information Hα, whether at least one time-frequency resource that is allocated by the PDCCH to the terminal device Tα-1 and that belongs to the time domain scheduling unit Tα is reallocated. If it is determined that the time-frequency resource is reallocated, the terminal device Tα-1 may not receive (for example, not decode or not demodulate) data carried on the reallocated time-frequency resource.

If it is determined that the time-frequency resource is not reallocated, the terminal device Tα-1 may receive (for example, decode or demodulate) data on all time-frequency resources in the time-frequency resources that are allocated by the PDCCH to the terminal device Tα-1 and that belong to the time domain scheduling unit Tα.

The following describes a time domain location that is of a time-frequency resource carrying the common posterior resource indication information Hα and that is in the time domain scheduling unit Tα.

For example, optionally, each piece of common posterior resource indication information is carried on the last M symbols in the corresponding time domain scheduling unit in time domain, and $M \geq 1$.

Specifically, for example but not for limitation, the time-frequency resource carrying the common posterior resource indication information Hα is located on the last M symbols in the time domain scheduling unit Tα.

It should be understood that the foregoing listed time domain location that is of the time-frequency resource carrying the common posterior resource indication information $H\alpha$ and that is in the time domain scheduling unit $T\alpha$ is merely an example for description. This application is not limited thereto. A location that is of the time-frequency resource carrying the common posterior resource indication information $H\alpha$ and that is in the time domain scheduling unit $T\alpha$ may be random, and a quantity of time-frequency resources (for example, symbols) carrying the common posterior resource indication information $H\alpha$ may also be randomly determined. In addition, when the time-frequency resource carrying the common posterior resource indication information $H\alpha$ includes a plurality of symbols, the plurality of symbols may be consecutive or inconsecutive. This is not specifically limited in this application.

Optionally, a quantity of REs carrying the common posterior resource indication information $H\alpha$ is fixed.

Further, the common posterior resource indication information $H\alpha$ may be carried on a last symbol in the time domain scheduling unit $T\alpha$, and may be evenly distributed in at least one frequency domain resource that can be reallocated in frequency domain resources. A frequency domain location of the common posterior resource indication information $H\alpha$ may vary with a size of a bandwidth of at least one reallocated frequency domain resource. The network device may obtain a frequency gain by evenly distributing the reallocated frequency domain resource in an entire frequency band that can be reallocated, thereby improving transmission reliability of the common posterior resource indication information $H\alpha$.

Figure 3:
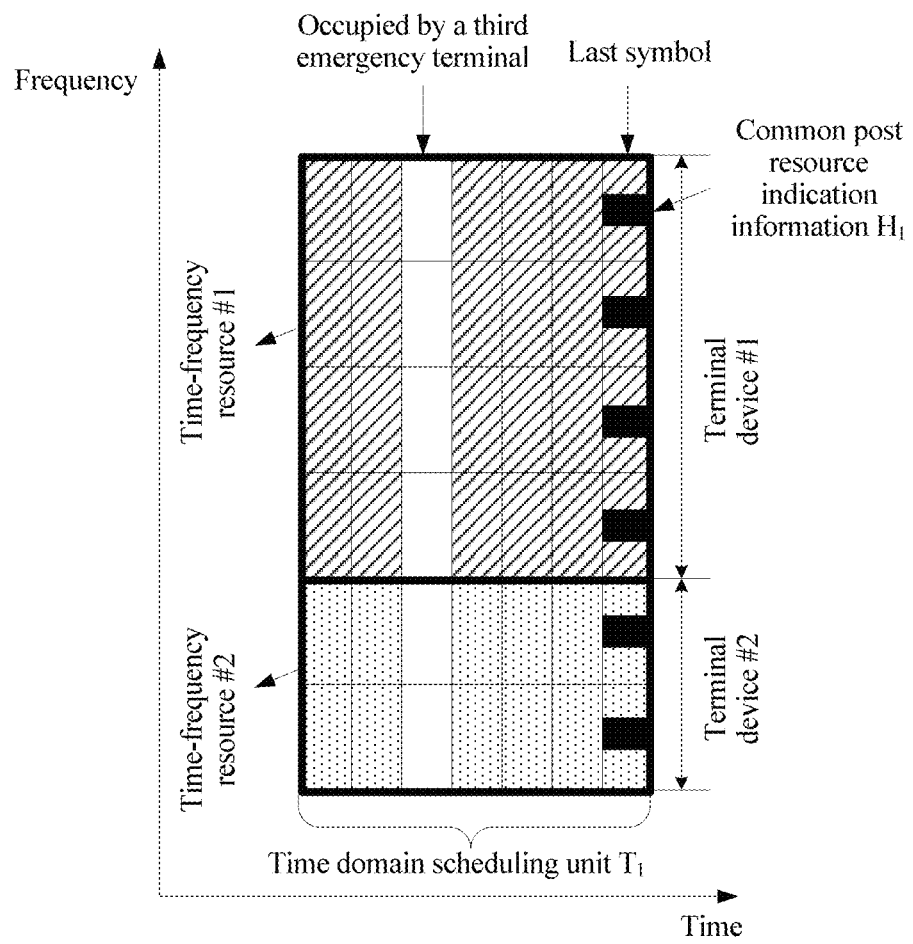
FIG. 3 is a schematic diagram of one or more time-frequency resources on which resource reallocation is performed according to an embodiment of this application.
Figure 4:
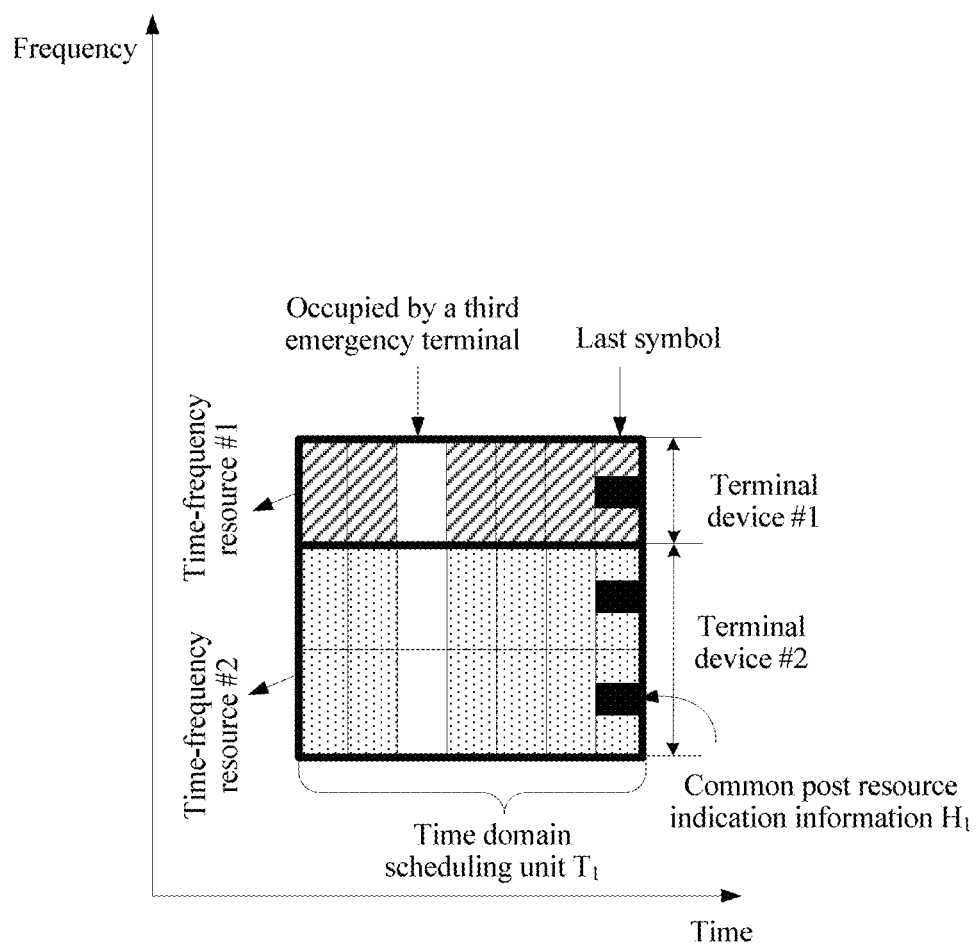
FIG. 4 is a schematic diagram of one or more time-frequency resources on which resource reallocation is performed according to an embodiment of this application.

FIG. 3 and FIG. 4 are schematic diagrams of one or more time-frequency resources on which resource reallocation is performed according to an embodiment of this application. As shown in FIG. 3 and FIG. 4, a time-frequency resource #1 of a terminal device #1 includes a third symbol in a time domain scheduling unit $T_1$ in time domain, and a time-frequency resource #2 of a terminal device #2 also includes the third symbol in the time domain scheduling unit $T_1$ in time domain. The third symbol in the time domain scheduling unit $T_1$ is reallocated to a third emergency terminal, and common posterior resource indication information $H_1$ occupies a last symbol in the time domain scheduling unit $T_1$ and is evenly distributed in an entire system frequency band.

Optionally, a time-frequency resource used to carry the at least one piece of posterior resource indication information is a reserved resource specified by a system.

Specifically, in this embodiment of this application, the time domain location that is of the time-frequency resource carrying the common posterior resource indication information $H\alpha$ and that is in the time domain scheduling unit $T\alpha$ may be specified by the system, and the time-frequency resource carrying the common posterior resource indication information $H\alpha$ may be prohibited from being used to carry information other than the common posterior resource indication information $H\alpha$.

In addition, in this embodiment of this application, the time-frequency resource carrying the common posterior resource indication information $H\alpha$ may be a common resource, For example, the time-frequency resource carrying the common posterior resource indication information $H\alpha$ can be detected by a plurality of terminal devices (for example, the terminal device $T\alpha$-1).

Optionally, in this embodiment of this application, each time domain scheduling unit may correspond to q frequency bands in frequency domain. Each piece of common posterior resource indication information may include q bit groups, and the q frequency bands are in a one-to-one correspondence with the q bit groups. Each bit group may include k–y bits. For a bit group Zj corresponding to a frequency band Fj, k–y bits in the bit group Zj are in a one-to-one correspondence with k–y mini-slots or symbols corresponding to the frequency band Fj. Bit values of the bits in the bit group Zj are used to indicate whether the last k–y mini-slots or symbols in a time domain scheduling unit corresponding to the frequency band Fj are reallocated, where $k\geq 1$, $q\geq 1$, $y\geq 0$, $k>y$, $j\in[1, k]$, and k is a quantity of mini-slots or symbols included in the time domain scheduling unit.

Specifically, when q=1 and y=1, each time domain scheduling unit may correspond to one frequency band F1 in frequency domain. The frequency band F1 is an entire frequency domain resource that can be scheduled. In this case, each piece of common posterior resource indication information may include one bit group Z1, and k bits included in the bit group Z1 are in a one-to-one correspondence with k mini-slots or symbols. Bit values of the k bits may be used to respectively indicate whether the k mini-slots or symbols that occupy the frequency band F1 are reused. For example, when each time domain scheduling unit includes six symbols, for example, k=6, each piece of common posterior resource indication information may include six bits. Based on values of indexes of the symbols, the six bits sequentially indicate whether a first symbol to a sixth symbol are reallocated. A reallocated symbol occupies, in frequency domain, the entire frequency domain resource that can be scheduled. For example, six bits of the common posterior resource indication information $H_1$ are 000101, indicating that a fourth symbol and a sixth symbol of the time domain scheduling unit $T_1$ are reallocated. Alternatively, when six bits are mow, it indicates that a fourth symbol and a sixth symbol are reallocated.

When q>1 and y=1, q=2 is used as an example for description. Each time domain scheduling unit corresponds to two frequency bands in frequency domain, for example, the entire frequency domain resource that can be scheduled may be divided into two frequency bands: a frequency band F1 and a frequency band F2. A bandwidth of the frequency band F1 may be equal or not equal to a bandwidth of the frequency band F2. This is not limited in this embodiment of this application. In this case, each piece of common posterior resource indication information may include two bit groups: a bit group Z1 corresponding to the frequency band F1 and a bit group Z2 corresponding to the frequency band F2. Herein, k bits included in the bit group Z1 are in a one-to-one correspondence with k mini-slots or symbols corresponding to the frequency band F1, and k bits included in the bit group Z2 are in a one-to-one correspondence with k mini-slots or symbols corresponding to the frequency band F2. The k bits included in the bit group Z1 are used to indicate whether the k mini-slots or symbols corresponding to the frequency band F1 are reallocated, and the k bits included in the bit group Z2 are used to indicate whether the k mini-slots or symbols corresponding to the frequency band F2 are reallocated. For example, each time domain scheduling unit includes seven symbols, for example, k=7. Each piece of common posterior resource indication information may include two bit groups, and each bit group may include seven bits. Based on values of indexes of the symbols, seven bits in the bit group Z1 sequentially indicate whether a first symbol to a seventh symbol that are located on the frequency band F1 in frequency domain are reallocated, and seven bits in the bit group Z2 sequentially indicate whether a first symbol to a seventh symbol that are located on the frequency band F2 in frequency domain are reallocated. Further, when a bit value is 0, it may indicate that a corresponding mini-slot or symbol on a corresponding frequency band is reallocated; or when a bit value is 1, it indicates that a corresponding mini-slot or symbol on a corresponding frequency band is not reallocated. Alternatively, when a bit value is 1, it may indicate that a corresponding mini-slot or symbol on a corresponding frequency band is reallocated; or when a bit value is 0, it indicates that a corresponding mini-slot or symbol on a corresponding frequency band is not reallocated.

Therefore, the network device may indicate, by sending X pieces of common posterior resource indication information including (q×k) original bits each, a reallocated time-frequency resource in the time-frequency resource scheduled by the PDCCH.

When y is not 1, for example, when y=2, it indicates that the first two mini-slots or symbols in k mini-slots or symbols included in each time domain scheduling unit in time domain are fixed and are not used for reallocation. In this case, k-2 bits corresponding to k-2 mini-slots or symbols included in each time domain scheduling unit are used to indicate reallocated time-frequency resources in a third mini-slot or symbol to a kth mini-slot or symbol in the corresponding time domain scheduling unit on a corresponding frequency band. For details, refer to the foregoing description when y=1. For brevity, details are not described herein again.

Therefore, the network device may indicate, by sending X pieces of posterior resource indication information including (q×(k−y)) original bits each, a reallocated time-frequency resource in the time-frequency resource scheduled by the PDCCH.

Optionally, each time domain scheduling unit includes a common time-frequency resource, a common time-frequency resource in an $i^{th}$ time domain scheduling unit is received by some or all of terminal devices scheduled in the $i^{th}$ time domain scheduling unit, i∈[1, N], and N is a quantity of time domain scheduling units included in the time-frequency resource in time domain.

Specifically, the time-frequency resource is a time-frequency resource that is scheduled by the network device and that includes one or more time domain scheduling units in time domain. For example, a time domain resource scheduled by the network device includes one or more time domain scheduling units. Each time domain scheduling unit may include a time domain resource of only one normal terminal scheduled by the network device, or may include time domain resources of a plurality of normal terminals scheduled by the network device. Each time domain scheduling unit includes a common time-frequency resource of all or some of terminal devices scheduled in the time domain scheduling unit. All or some of the terminal devices scheduled in the time domain scheduling unit may receive, on the common time-frequency resource, posterior resource indication information corresponding to the time domain scheduling unit.

In the wireless communication method in this embodiment of this application, by detecting common posterior resource indication information corresponding to a time domain scheduling unit to which a time-frequency resource allocated to the terminal device belongs, the terminal device may determine whether there is a reallocated time-frequency resource in the time-frequency resource allocated to the terminal device, and determine the reallocated time-frequency resource in the time-frequency resource allocated to the terminal device. In this way, the terminal device may receive (for example, decode or demodulate) only data carried on a time-frequency resource that is not reallocated, and does not receive (for example, does not decode or does not demodulate) data carried on the reallocated time-frequency resource, to correctly receive downlink data. Therefore, receiving performance loss of the terminal device that is caused by resource reallocation can be reduced by using the wireless communication method in this embodiment of this application.

Case 2

Optionally, a at least one piece of posterior resource indication information includes at least one piece of dedicated posterior resource indication information, the at least one piece of dedicated posterior resource indication information is in a one-to-one correspondence with at least one terminal device, the at least one terminal device belongs to terminal devices scheduled by the PDCCH. A $J^{th}$ piece of dedicated posterior resource indication information in the at least one piece of dedicated posterior resource indication information indicates at least one reallocated time-frequency resource in time-frequency resources allocated to a terminal device corresponding to the $J^{th}$ piece of dedicated posterior resource indication information, J∈[1, Y], and Y is a quantity of terminal devices.

Specifically, in this embodiment of this application, the terminal device whose time-frequency resources indicated by the PDCCH includes at least one reallocated time-frequency resource is denoted as a terminal device Tβ. For example, some or all of the time-frequency resources that are used by the terminal device Tβ and that are indicated by the PDCCH are reallocated, or the terminal device Tβ may be an original allocation object (or an allocation object before reallocation) of the time-frequency resource #M. There may be one or more terminal devices Tβ. This is not specifically limited in this application.

It should be noted that in this embodiment of this application, processing processes of the terminal devices Tβ may be similar. Herein, for ease of understanding and description, a processing process of one of the terminal devices Tβ (which is denoted as a terminal device Tβ#1) is used as an example for description.

Specifically, the network device determines at least one reallocated time-frequency resource (which is denoted as a time-frequency resource #Mβ#1 below for ease of understanding and differentiation) in time-frequency resources that are used by the terminal device Tβ#1 and that are indicated by the PDCCH.

Subsequently, the network device may generate indication information (namely, an example of dedicated posterior resource indication information) used to indicate the time-frequency resource #Mβ#1. For ease of understanding and differentiation, the indication information is denoted as dedicated posterior resource indication information Hβ#1 below.

In addition, the network device may send the dedicated posterior resource indication information Hβ#1 to the terminal device Tβ#1 by using the time-frequency resource (which is denoted as a time-frequency resource #Tβ#1 below for ease of understanding) scheduled by the PDCCH to the terminal device Tβ#1. In this way, the terminal device Tβ#1 may determine, based on the dedicated posterior resource indication information Hβ#1, that the time-frequency resource #Mβ#1 is reallocated; and accordingly the terminal device Tβ#1 may not receive (for example, not decode or not demodulate) data carried on the time-frequency resource #Mβ#1.

The following describes a time domain location that is of a time-frequency resource carrying the dedicated posterior resource indication information Hβ#1 and that is in the time-frequency resource #Tβ#1.

For example, optionally, each piece of dedicated posterior resource indication information is carried on the last N symbols that are allocated to a corresponding terminal device and that are indicated by the PDCCH, and N≥1.

Specifically, for example but not for limitation, the time-frequency resource carrying the dedicated posterior resource indication information Hβ#1 is located on the last N symbols in the time-frequency resource #Tβ#1.

It should be understood that the foregoing listed location that is of the time-frequency resource carrying the dedicated posterior resource indication information Hβ#1 and that is in the time-frequency resource #Tβ#1 is merely an example for description. This application is not limited thereto. The location that is of the time-frequency resource carrying the dedicated posterior resource indication information Hβ#1 and that is in the time-frequency resource #Tβ#1 may be random, and a quantity of time-frequency resources (for example, symbols) carrying the dedicated posterior resource indication information Hβ#1 may also be randomly determined. In addition, when the time-frequency resource carrying the dedicated posterior resource indication information Hβ#1 includes a plurality of symbols, the plurality of symbols may be consecutive or inconsecutive. This is not specifically limited in this application.

Optionally, a quantity of REs carrying the dedicated posterior resource indication information Hβ#1 may vary with an encoding rate.

Figure 5:
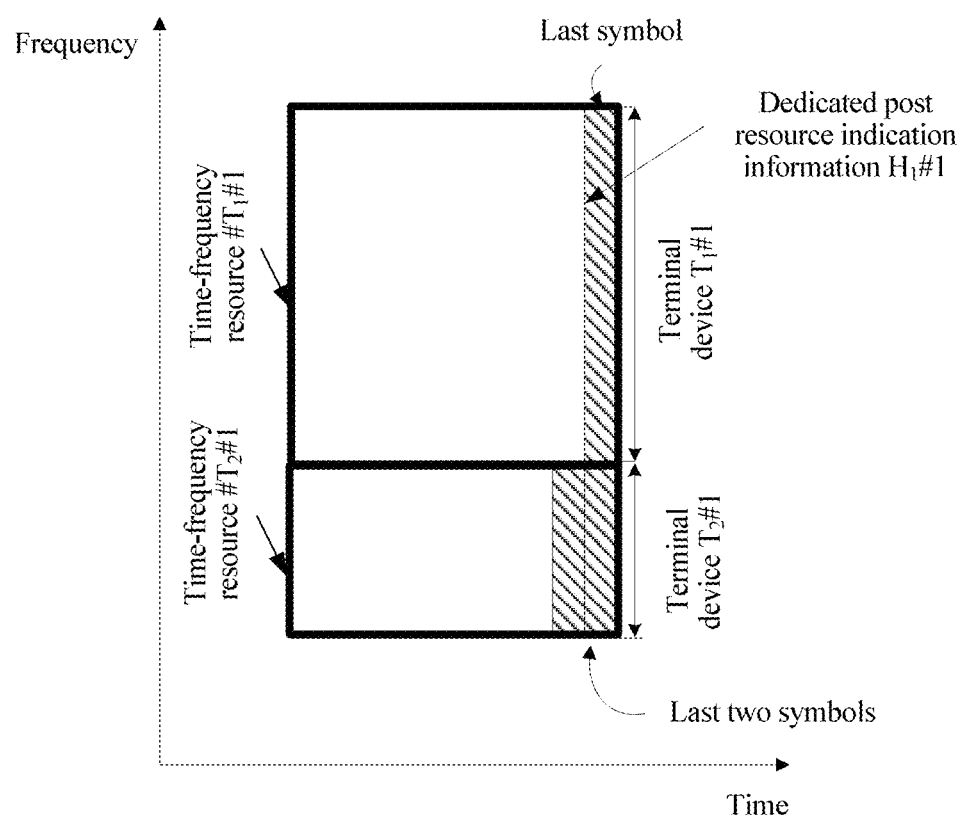
FIG. 5 is another schematic diagram of one or more time-frequency resources on which resource reallocation is performed according to an embodiment of this application.

FIG. 5 is a schematic diagram of a time-frequency resource on which resource reallocation is performed according to an embodiment of this application. As shown in FIG. 5, in time domain, dedicated posterior resource indication information $H_1\#1$ of a terminal device $T_1\#1$ is located on a last symbol of a time-frequency resource $\#T_1\#1$ allocated to the terminal device $T_1\#1$, and in time domain, dedicated posterior resource indication information H2#1 of a terminal device $T_2\#1$ is located on the last two symbols of a time-frequency resource $\#T_2\#1$ allocated to the terminal device $T_2\#1$.

Optionally, when a frequency band allocated to the terminal device Tβ is less than a specific quantity of carriers, for example, less than 72 subcarriers, 48 subcarriers, or 36 subcarriers, the dedicated posterior resource indication information Hβ#1 may occupy the last two symbols of the time-frequency resource #Tβ#1.

Optionally, according to a direction from a last symbol to a second last symbol in the time-frequency resource Tβ#1 of the terminal device Tβ#1, the dedicated posterior resource indication information Hβ#1 may be arranged in a direction from a subcarrier with a minimum serial number to a subcarrier with a maximum serial number on the last symbol, or the dedicated posterior resource indication information Hβ#1 may be arranged in a direction from a subcarrier with a maximum serial number to a subcarrier with a minimum serial number on the last symbol.

Figure 6:
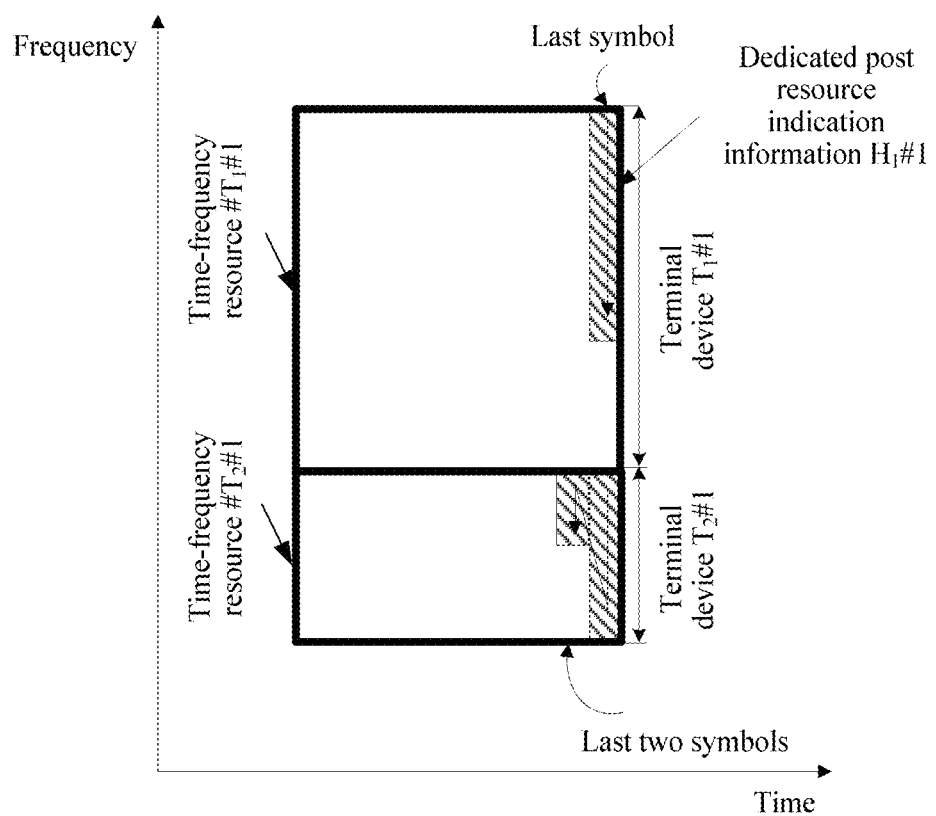
FIG. 6 is another schematic diagram of one or more time-frequency resources on which resource reallocation is performed according to an embodiment of this application.

FIG. 6 is a schematic diagram of one or more time-frequency resources on which resource reallocation is performed according to an embodiment of this application. As shown in FIG. 6, dedicated posterior resource indication information $H_1\#1$ of a terminal device $T_1\#1$ is located on a last symbol of a time-frequency resource $\#T_1\#1$ in time domain. According to a direction from a last symbol to a second last symbol of a time-frequency resource $\#T_2\#1$ allocated to a terminal device $T_2\#1$, dedicated posterior resource indication information H2#1 of the terminal device $T_2\#1$ is arranged in a direction from a subcarrier with a minimum serial number to a subcarrier with a maximum serial number on the last symbol.

Optionally, in this embodiment of this application, the time-frequency resource allocated to the terminal device corresponding to the $J^{th}$ piece of dedicated posterior resource indication information corresponds to z frequency bands in frequency domain, the $J^{th}$ piece of dedicated posterior resource indication information includes z bit groups. The z frequency bands are in a one-to-one correspondence with the z bit groups, and each bit group includes p−s bits. For a bit group Ur corresponding to a frequency band Dr. P−s bits in the bit group Ur are in a one-to-one correspondence with p−s mini-slots or symbols corresponding to the frequency band Dr. Bit values of the bits in the bit group Ur are used to indicate whether the last p−s mini-slots or symbols, in time domain, of the time-frequency resource that is allocated to the terminal device corresponding to the $J^{th}$ piece of dedicated posterior resource indication information and that corresponds to the frequency band Dr are reallocated. S≥0, p≥1, z≥1, p>s, r∈[1, p]. P is a quantity of mini-slots or symbols included, in time domain, in the time-frequency resource allocated to the terminal device corresponding to the $J^{th}$ piece of dedicated posterior resource indication information.

Specifically, when z=1 and s=1, the time-frequency resource allocated to the terminal device corresponding to the $j^{th}$ piece of dedicated posterior resource indication information may correspond to one frequency band D1 in frequency domain. The frequency band D1 is a frequency domain resource of the time-frequency resource allocated to the terminal device corresponding to the $j^{th}$ piece of dedicated posterior resource indication information. In this case, the $j^{th}$ piece of dedicated posterior resource indication information may include one bit group U1, and p bits included in the bit group U1 are in a one-to-one correspondence with p mini-slots or symbols. Bit values of the p bits may be used to respectively indicate whether the p mini-slots or symbols that occupy the frequency band D1 are reused. For example, when the time-frequency resource allocated to the terminal device corresponding to the $j^{th}$ piece of dedicated posterior resource indication information includes six symbols in time domain, for example, when p=6, the $j^{th}$ piece of dedicated posterior resource indication information may include six bits. Based on values of indexes of the symbols, the six bits sequentially indicate whether a first symbol to a sixth symbol are reallocated. When a bit value of a bit is 0, it may indicate that a corresponding symbol or mini-slot is reallocated; or when a bit value of a bit is 1, it may indicate that a corresponding symbol or mini-slot is not reallocated. Alternatively, when a bit value of a bit is 1, it may indicate that a corresponding symbol or mini-slot is reallocated; or when a bit value of a bit is 0, it may indicate that a corresponding symbol or mini-slot is not reallocated.

When z>1 and s=1, z=2 is used as an example for description. The time-frequency resource allocated to the terminal device corresponding to the $j^{th}$ piece of dedicated posterior resource indication information corresponds to two frequency bands in frequency domain. For example, a frequency domain resource of the time-frequency resource allocated to the terminal device corresponding to the $j^{th}$ piece of dedicated posterior resource indication information may be divided into two frequency bands: a frequency band D1 and a frequency band D2. In this case, the $j^{th}$ piece of dedicated posterior resource indication information may include two bit groups: a bit group U1 corresponding to the frequency band D1 and a bit group U2 corresponding to the frequency band D2. Herein, p bits included in the bit group U1 are in a one-to-one correspondence with p mini-slots or symbols corresponding to the frequency band D1, and p bits included in the bit group U2 are in a one-to-one correspondence with p mini-slots or symbols corresponding to the frequency band D2. The p bits included in the bit group U1 are used to indicate whether the p mini-slots or symbols corresponding to the frequency band D1 are reallocated, and the p bits included in the bit group U2 are used to indicate whether the p mini-slots or symbols corresponding to the frequency band D2 are reallocated. For example, the time-frequency resource allocated to the terminal device corresponding to the $j^{th}$ piece of dedicated posterior resource indication information includes seven symbols in time domain, for example, p=7. The $j^{th}$ piece of dedicated posterior resource indication information may include two bit groups, and each bit group may include seven bits. Based on values of indexes of the symbols, seven bits in the bit group U1 sequentially indicate whether a first symbol to a seventh symbol that are located on the frequency band D1 in frequency domain are reallocated, and seven bits in the bit group U2 sequentially indicate whether a first symbol to a seventh symbol that are located on the frequency band D2 in frequency domain are reallocated. Further, when a bit value is 0, it may indicate that a corresponding mini-slot or symbol is reallocated; or when a bit value is 1, it indicates that a corresponding mini-slot or symbol is not reallocated. Alternatively, when a bit value is 1, it may indicate that a corresponding mini-slot or symbol is reallocated; or when a bit value is 0, it indicates that a corresponding mini-slot or symbol is not reallocated.

Therefore, the network device may indicate, by sending dedicated posterior resource indication information including z×p original bits, a reallocated time-frequency resource in a time-frequency resource of a terminal device scheduled by the PDCCH.

When s is not 0, for example, when s=1, it indicates that a first mini-slot or symbol in the p mini-slots or symbols included, in time domain, in the time-frequency resource allocated to the terminal device corresponding to the $j^{th}$ piece of dedicated posterior resource indication information is fixed and is not used for reallocation.

Therefore, the network device may indicate, by sending dedicated posterior resource indication information including z×(p−s) original bits, a reallocated time-frequency resource in a time-frequency resource of a terminal device scheduled by the PDCCU.

In this embodiment of this application, by detecting dedicated posterior resource indication information carried on a time-frequency resource that is indicated by the PDCCH and that is allocated to the terminal device, the terminal device may determine whether there is at least one reallocated time-frequency resource in the time-frequency resources allocated to the terminal device, and determine the reallocated time-frequency resource in the time-frequency resources allocated to the terminal device. In this way, during downlink transmission, the terminal device may demodulate or decode only downlink data on at least one time-frequency resource that is not reallocated in the time-frequency resources allocated to the terminal device, to correctly receive the downlink data. Therefore, receiving performance loss of the terminal device that is caused by resource reallocation can be reduced by using the wireless communication method in this embodiment of this application.

It should be understood that the posterior resource indication information in this embodiment of this application, for example, common posterior resource indication information or dedicated posterior resource indication information, may include a bit obtained after the bit (the original bit) described above is encoded and modulated, a pilot channel that is sent together with the bit, and the like.

In another embodiment of this application, before the terminal device receives the corresponding PDCCH, the method may further include: receiving, by the terminal device, indication signaling sent by the network device. The indication signaling may be used to indicate a frequency domain resource that can be reallocated, or the indication signaling may be used to indicate whether the terminal device needs to receive the posterior resource indication information. The terminal device may be each terminal device scheduled in the current scheduling period.

Further, the terminal device may receive system information, Radio Resource Control RRC signaling, or a Media Access Control control element (MAC CE) sent by the network device. The system information may carry the indication signaling, the RRC layer signaling may carry the indication signaling, or the MAC CE may carry the indication signaling.

When the indication signaling indicates a frequency domain resource that can be allocated in the time-frequency resource scheduled by the PDCCH, the indication signaling may specifically include a downlink resource block allocation field. The downlink resource block allocation field in the indication signaling may be used to indicate a start location and an end location of a resource block that can be reallocated, or the downlink resource block allocation field in the indication signaling may be used to indicate a start location and a quantity of a resource block that can be reallocated. A normal terminal may determine, by reading the downlink resource block allocation field in the indication signaling, whether the time-frequency resource scheduled by the PDCCH includes a frequency domain resource that can be reallocated.

In addition, the indication signaling may be used to indicate whether all frequency domain resources of a carrier can be reallocated. Further, the terminal device may receive system information or a broadcast channel sent by the network device. The system information may carry the indication signaling, or the broadcast channel may carry the indication signaling.

For example, the indication signaling may include one bit, and the bit may be referred to as a first bit. A bit value of the first bit may indicate whether the entire carrier can be reallocated. For example, when the first bit is 0, it indicates that the entire carrier can be reallocated; or when the first bit is 1, it indicates that the entire carrier cannot be reallocated. Alternatively, when the first bit is 1, it indicates that the entire carrier can be reallocated; or when the first bit is 0, it indicates that the entire carrier cannot be reallocated.

Figure 7:
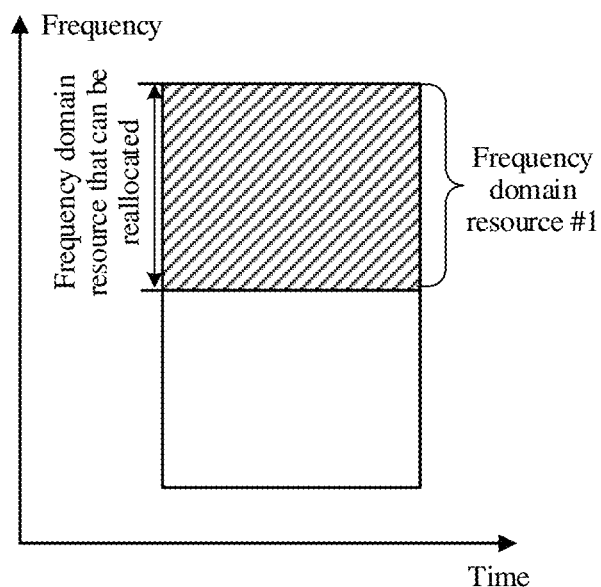
FIG. 7 is still another schematic diagram of one or more time-frequency resources on which resource reallocation is performed according to an embodiment of this application.
Figure 8:
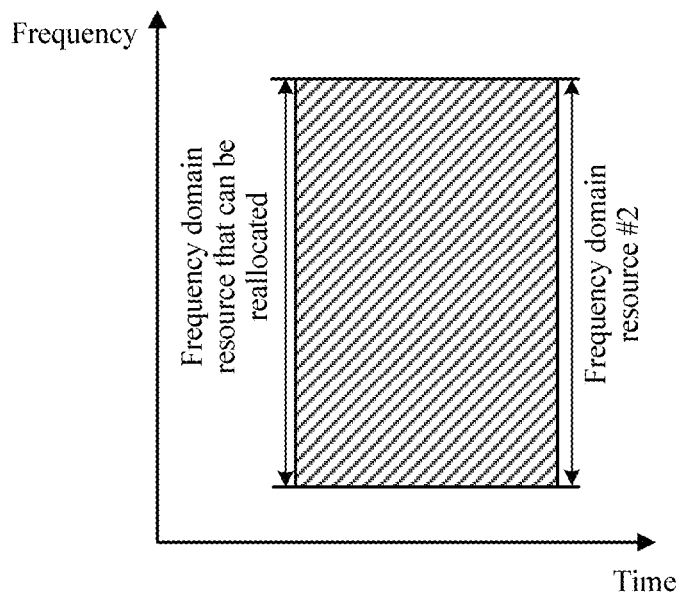
FIG. 8 is still another schematic diagram of one or more time-frequency resources on which resource reallocation is performed according to an embodiment of this application.

FIG. 7 and FIG. 8 are schematic diagrams of a time-frequency resource on which resource reallocation is performed according to an embodiment of this application.

Indication signaling may indicate, by using a downlink resource block allocation field, a frequency domain resource that can be reallocated in an entire carrier. FIG. 7 shows a frequency domain resource #1 that is indicated by the indication signaling and that can be reallocated in the entire carrier.

When a first bit in the indication signaling is 0, it indicates that an entire carrier can be reallocated. FIG. 8 shows a frequency domain resource #2 that is indicated by the indication signaling and that can be reallocated in the entire carrier.

Optionally, the indication signaling may indicate whether the terminal device needs to receive the posterior resource indication information. The indication signaling may be carried by using RRC layer signaling. In this case, before the terminal device receives the posterior resource indication information sent by the network device, the terminal device further needs to determine whether the terminal device needs to receive the posterior resource indication information. When the terminal device determines that the terminal device needs to receive the posterior resource indication information, the terminal device may receive the posterior resource indication information.

Further, the indication signaling may include one bit, and the bit may be referred to as a second bit. A bit value of the second bit may indicate whether a normal terminal needs to receive the posterior resource indication information. For example, when the second bit is 0, it indicates that the normal terminal does not need to receive the posterior resource indication information until the network device performs reconfiguration; or when the second bit is 1, it indicates that the normal terminal needs to receive the posterior resource indication information until the network device performs reconfiguration. Alternatively, when the second bit is 1, it indicates that the normal terminal does not need to receive the posterior resource indication information until the network device performs reconfiguration; or when the second bit is 0, it indicates that the normal terminal needs to receive the posterior resource indication information until the network device performs reconfiguration.

Optionally, the PDCCH may further indicate whether the terminal device needs to receive the posterior resource indication information. After receiving the PDCCH, the terminal device may determine, based on the PDCCH, whether to receive the posterior resource indication information. When the terminal device determines, based on the PDCCH, to receive the posterior resource indication information, the terminal device may receive the posterior resource indication information.

Figure 9:
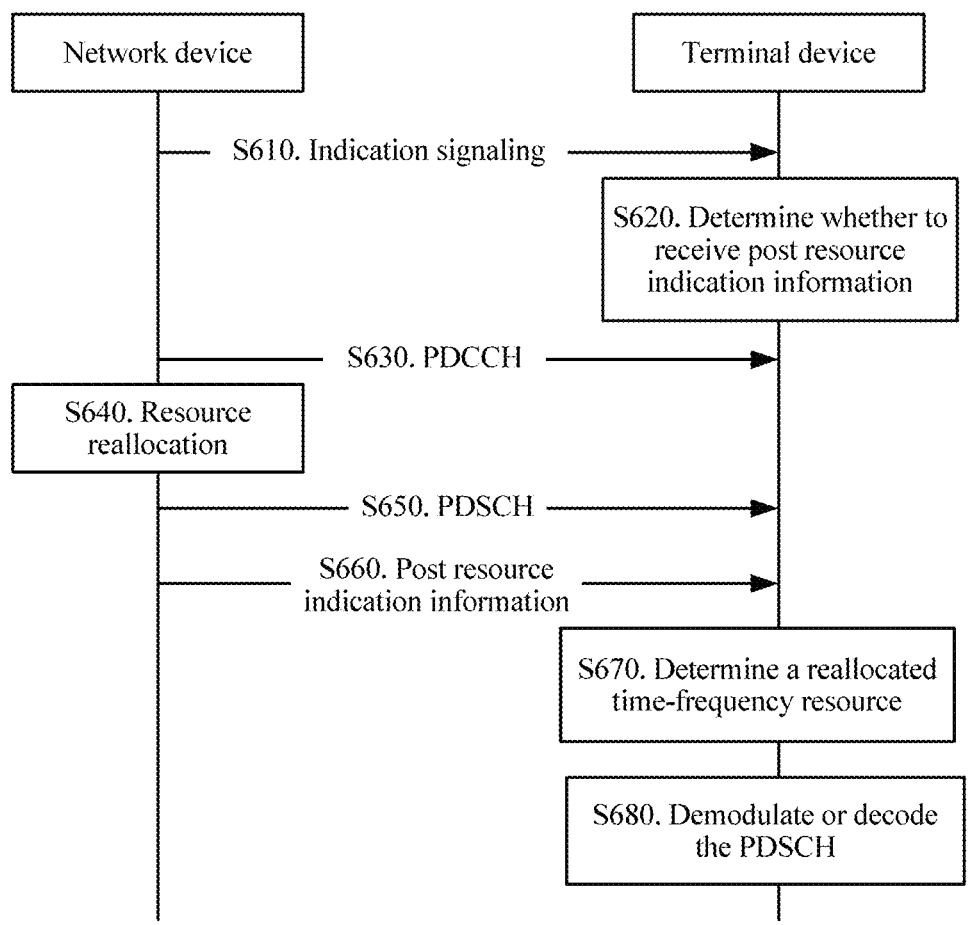
FIG. 9 is a schematic flowchart of a wireless communication method according to an embodiment of this application.

FIG. 9 is a schematic flowchart of another wireless communication method according to this application.

S610. A network device sends indication signaling. Correspondingly, a terminal device receives the indication signaling sent by the network device.

The indication signaling may be used to indicate at least one frequency domain resource that can be reallocated. The indication signaling may be further used to indicate whether the terminal device needs to receive posterior resource indication information. For details, refer to the foregoing description. For brevity, details are not described herein again.

S620. A terminal device determines, based on the indication signaling, whether to receive posterior resource indication information.

Specifically, when the indication signaling indicates that all frequency domain resources that can be allocated are not reallocated, or the indication signaling indicates that the terminal device does not need to receive the posterior resource indication information, the terminal device determines that the terminal device does not need to receive the posterior resource indication information.

S630. The network device sends a PDCCH. Correspondingly, the terminal device receives the PDCCH sent by the network device.

Specifically, for this step, refer to description of S210. For brevity, details are not described herein again.

It should be noted that S620 and S630 may be performed concurrently, or S630 may be performed before S620. This is not limited in this embodiment of this application.

S640. The network device reallocates at least one of time-frequency resources scheduled by the PDCCH.

Specifically, for this step, refer to description of S220. For brevity, details are not described herein again.

S650. The network device sends a physical downlink shared channel (PDSCH).

Specifically, the network device sends the PDSCH on at least one time-frequency resource that is not reallocated in the time-frequency resources that are indicated by the PDCCH and that are allocated to the terminal device. It should be noted that a sequence of step S640 and step S650 is not limited in this application. Step S650 may be performed before step S640, or step S640 may be implemented in a process of implementing step S650.

S660. The network device sends the posterior resource indication information to the terminal device.

For the posterior resource indication information, refer to the foregoing description. For brevity, details are not described herein again. Because a re-scheduling action is performed in a process of sending downlink data to a normal terminal, there may be no execution sequence of S650 and S660.

The terminal device may or may not receive the posterior resource indication information sent by the network device. Specifically, when the terminal device determines not to receive the posterior resource indication information in S620, the terminal device does not receive the posterior resource indication information. Alternatively, because the PDSCH that occupies only several symbols close to the PDCCH can meet a requirement of a service of an emergency terminal device, there is no need to further perform reallocation. Therefore, when the terminal device learns, based on the PDCCH received in S640, that an end symbol of the PDSCH is only w symbols away from an end symbol of the PDCCH, the terminal device does not receive the posterior resource indication information, where w is greater than or equal to 1. For example, w may be 2 or 3.

The terminal device receives the posterior resource indication information when the terminal device determines to receive the posterior resource indication information in S620, or when a standard specifies that the terminal device needs to receive the posterior resource indication information.

S670. The terminal device determines at least one reallocated time-frequency resource in the time-frequency resources that are indicated by the PDCCH and that are allocated to the terminal device.

Specifically, the terminal device receives the posterior resource indication information when the terminal device determines that the terminal device needs to receive the posterior resource indication information. In addition, based on the PDCCH and the posterior resource indication information, the terminal device may determine whether there is at least one reallocated time-frequency resource in the time-frequency resources that are indicated by the PDCCH and that are allocated to the terminal device, and determine specific reallocated time-frequency resources.

S680. The terminal device demodulates or decodes the PDSCH.

Specifically, after the terminal device determines whether there is the reallocated time-frequency resource in the time-frequency resources that are indicated by the PDCCH and that are allocated to the terminal device, and determines the specific reallocated time-frequency resources, the terminal device may demodulate or decode only a PDSCH carried on at least one time-frequency resource that is not reallocated in the time-frequency resource allocated to the terminal device, to correctly receive the downlink data, so that receiving performance loss of the terminal device that is caused by resource reallocation can be reduced.

In the wireless communication method shown in FIG. 9, when a standard specifies that all terminal devices need to receive indication signaling, the network device may not perform S610, and correspondingly the terminal device does not need to receive the indication signaling.

Figure 10:
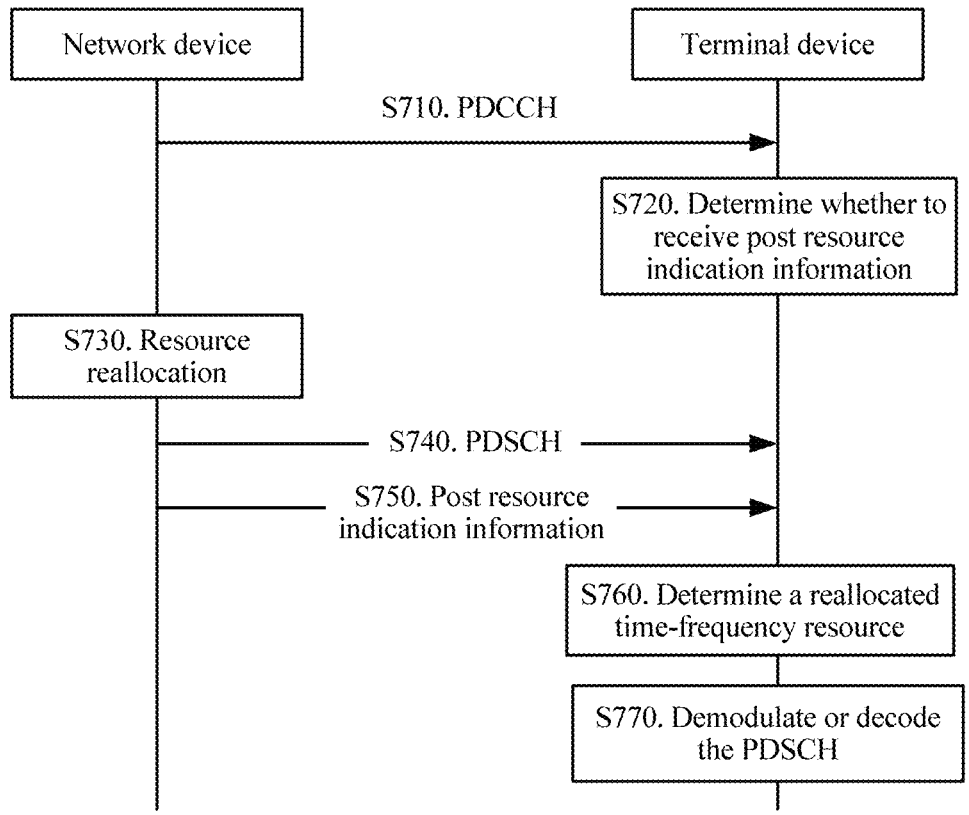
FIG. 10 is a schematic flowchart of a wireless communication method according to an embodiment of this application.

FIG. 10 is a schematic flowchart of another wireless communication method according to this application.

S710. A network device sends a PDCCH. Correspondingly, a terminal device receives the PDCCH sent by the network device.

Specifically, for this step, refer to description of S210. For brevity, details are not described herein again.

S720. A terminal device determines, based on the PDCCH, whether to receive posterior resource indication information.

Specifically, the PDCCH may be further used to indicate whether the terminal device needs to receive the posterior resource indication information. The terminal device receives the posterior resource indication information only when the terminal device determines, based on the PDCCH, that the terminal device needs to receive the posterior resource indication information. When the terminal device determines, based on the PDCCH, that the terminal device does not need to receive the posterior resource indication information, the terminal device does not receive the posterior resource indication information.

S730. The network device reallocates at least one of a time-frequency resource scheduled by the PDCCH.

Specifically, for this step, refer to description of S220. For brevity, details are not described herein again.

It should be noted that there is no execution sequence of S720 and S730.

S740. The network device sends a physical downlink shared channel (PDSCH).

Specifically, the network device sends the PDSCH on a time-frequency resource that is not reallocated in the time-frequency resource that is indicated by the PDCCH and that is allocated to the terminal device.

S750. The network device sends the posterior resource indication information to the terminal device.

For the posterior resource indication information, refer to the foregoing description. For brevity, details are not described herein again. Because a re-scheduling action is performed in a process of sending downlink data to a normal terminal, there may be no execution sequence of S740 and S750.

The terminal device may or may not receive the posterior resource indication information sent by the network device. Specifically, when the terminal device determines not to receive the posterior resource indication information in S720, the terminal device does not receive the posterior resource indication information. The terminal device receives the posterior resource indication information when the terminal device determines to receive the posterior resource indication information in S720, or when a standard specifies that the terminal device needs to receive the posterior resource indication information.

S760. The terminal device determines a reallocated time-frequency resource in the time-frequency resource that is indicated by the PDCCH and that is allocated to the terminal device.

Specifically, the terminal device receives the posterior resource indication information when the terminal device determines that the terminal device needs to receive the posterior resource indication information. In addition, based on the PDCCH and the posterior resource indication information, the terminal device may determine whether there is a reallocated time-frequency resource in the time-frequency resource that is indicated by the PDCCH and that is allocated to the terminal device, and determine specific reallocated time-frequency resources.

S770. The terminal device demodulates or decodes the PDSCH.

Specifically, after the terminal device determines whether there is the reallocated time-frequency resource in the time-frequency resource that is indicated by the PDCCH and that is allocated to the terminal device, and determines the specific reallocated time-frequency resources, the terminal device may demodulate or decode only a PDSCH carried on a time-frequency resource that is not reallocated in the time-frequency resource allocated to the terminal device, to correctly receive the downlink data, so that receiving performance loss of the terminal device that is caused by resource reallocation can be reduced.

In the wireless communication method in this application, an emergency terminal device may determine a time-frequency location of the posterior resource indication information, and even if a last time domain unit is reallocated, the emergency terminal may dodge a time-frequency resource in which the posterior resource indication information is located. In an embodiment, when all time-frequency resources scheduled by the PDCCH are reallocated, the network device may not send the posterior resource indication information, and the network device sends an indication to the emergency terminal device to indicate that the terminal device does not need to perform a dodge. In another embodiment, when a normal terminal device detects that the posterior resource indication information is faulty, the normal terminal considers that all time-frequency resources indicated by the posterior resource indication information are reallocated.

Figure 11:
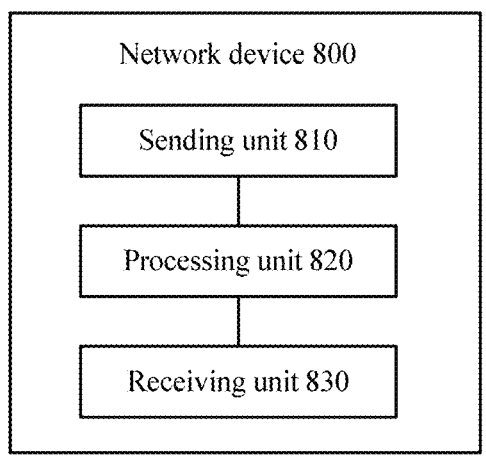
FIG. 11 is a schematic block diagram of a network device according to an embodiment of this application.

FIG. 11 is a schematic block diagram of a network device 800 according to an embodiment of this application. As shown in FIG. 11, the network device 800 includes a sending unit 810, a processing unit 820, and a receiving unit 830.

The sending unit 810 is configured to send a physical downlink control channel PDCCH, where the PDCCH indicates one or more time-frequency resource scheduled by the network device.

The processing unit 820 is configured to reallocate at least one of the time-frequency resources.

The sending unit Bio is further configured to send at least one piece of posterior resource indication information, where the at least one piece of posterior resource indication information indicates the reallocated time-frequency resource in the time-frequency resources.

The network device in this embodiment of this application sends the physical downlink control channel PDCCH and the at least one piece of posterior resource indication information to each terminal device scheduled in a current scheduling period, so that the terminal device can determine whether there is at least one reallocated time-frequency resource in a time-frequency resources allocated to the terminal device in the current scheduling period, and determine the reallocated time-frequency resource in the time-frequency resources allocated to the terminal device in the current scheduling period. In this way, the terminal device may receive (for example, decode or demodulate) only data carried on at least one time-frequency resource that is not reallocated, and does not receive (for example, does not decode or does not demodulate) data carried on the reallocated time-frequency resource, to correctly receive downlink data. Therefore, receiving performance loss of the terminal device that is caused by resource reallocation can be reduced by using the network device in this embodiment of this application.

It should be noted that in this embodiment of this application, the sending unit Bio may be implemented by a transmitter, and the receiving unit 820 may be implemented by a receiver.

Figure 12:
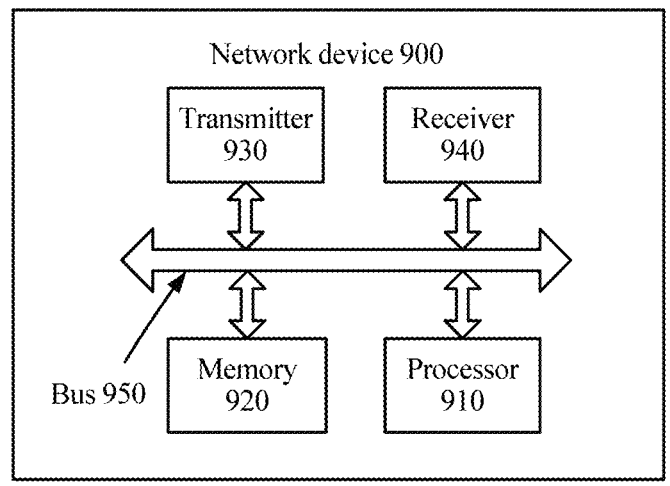
FIG. 12 is a schematic block diagram of a network device according to an embodiment of this application.

As shown in FIG. 12, a network device 900 may include a processor 910, a memory 920, a transmitter 930, and a receiver 940. The memory 920 is configured to store an instruction, and the processor 910, the transmitter 930, and the receiver 940 are configured to execute the instruction stored in the memory 920, to control wireless communication.

Optionally, components in the network device 900 may be coupled together by using a bus system 950. In addition to a data bus, the bus system 950 further includes a power bus, a control bus, and a status signal bus.

It should be noted that the foregoing method embodiments of this application may be applied to a processor, or implemented by a processor. The processor may be an integrated circuit chip and has a signal processing capability. In an implementation process, steps in the foregoing method embodiments can be implemented by using a hardware integrated logical circuit in the processor, or by using instructions in a form of software. The processor may be a general-purpose processor, a digital signal processor (DSP), an application-specific integrated circuit (ASIC), a field programmable gate array (FPGA), another programmable logic device, a discrete gate, a transistor logic device, or a discrete hardware component. The processor may implement or perform the methods, the steps, and logical block diagrams that are disclosed in the embodiments of this application. The general-purpose processor may be a microprocessor or the processor may be any conventional processor, or the like. The steps of the methods disclosed in the embodiments of this application may be directly performed and completed by a hardware decoding processor, or may be performed and completed by using a combination of hardware and software modules in the decoding processor. The software module may be located in a mature storage medium in the field, such as a random access memory, a flash memory, a read-only memory, a programmable read-only memory, an electrically-erasable programmable memory, or a register. The storage medium is located in a memory, and the processor reads information in the memory and completes the steps in the foregoing methods in combination with hardware of the processor.

It may be understood that the memory in the embodiments of this application may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. For example but not for limitation, many forms of RAMs are available, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). It should be noted that the memory in the system and method described in this specification aims to include but is not limited to these memories and any memory of another proper type.

It should be understood that the network device 800 shown in FIG. 11 or the network device 900 shown in FIG. 12 can implement processes implemented in the foregoing method embodiments. To avoid repetition, details are not described herein again.

In the network devices shown in FIG. 11 and FIG. 12, optionally, in an embodiment, the time-frequency resource corresponds to at least one time domain scheduling unit in time domain, and each time domain scheduling unit includes at least one mini-slot, or each time domain scheduling unit includes at least one symbol.

Optionally, the at least one piece of posterior resource indication information includes at least one piece of common posterior resource indication information, the at least one time domain scheduling unit is in a one-to-one correspondence with the at least one piece of common posterior resource indication information, an $I^{th}$ piece of common posterior resource indication information in the at least one piece of common posterior resource indication information is received by some or all of terminal devices scheduled in a time domain scheduling unit corresponding to the $I^{th}$ piece of common posterior resource indication information, each piece of common posterior resource indication information indicates a reallocated time-frequency resource in a corresponding time domain scheduling unit, $I \in [1, X]$, and X is a quantity of pieces of common posterior resource indication information.

Optionally, each piece of common posterior resource indication information is carried on the last M symbols in the corresponding time domain scheduling unit in time domain, and $M \geq 1$.

Optionally, a time-frequency resource used to carry the at least one piece of posterior resource indication information is a reserved resource specified by a system.

Optionally, the at least one piece of posterior resource indication information includes at least one piece of dedicated posterior resource indication information, the at least one piece of dedicated posterior resource indication information is in a one-to-one correspondence with at least one terminal device, the at least one terminal device belongs to terminal devices scheduled by the PDCCH, a $J^{th}$ piece of dedicated posterior resource indication information in the at least one piece of dedicated posterior resource indication information indicates a reallocated time-frequency resource in a time-frequency resource allocated to a terminal device corresponding to the $J^{th}$ piece of dedicated posterior resource indication information, $J \in [1, Y]$, and Y is a quantity of terminal devices.

Optionally, each piece of dedicated posterior resource indication information is carried on the last N symbols that are allocated to a corresponding terminal device and that are indicated by the PDCCH, and $N \geq 1$.

Optionally, a time-frequency resource used to carry the at least one piece of posterior resource indication information is a time-frequency resource that is prohibited from being reallocated.

Figure 13:
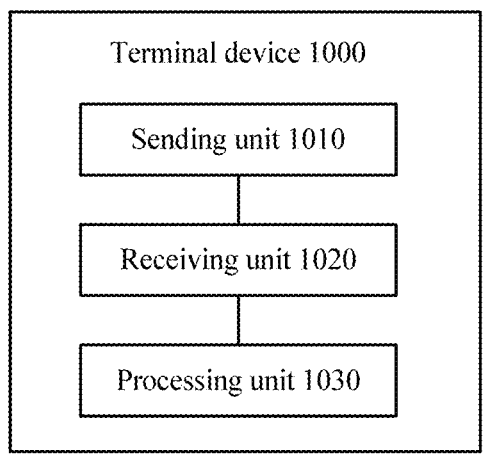
FIG. 13 is a schematic block diagram of a terminal device according to an embodiment of this application.

FIG. 13 is a schematic block diagram of a terminal device 1000 according to an embodiment of this application. As shown in FIG. 13, the terminal device 1000 includes a sending unit 1010, a receiving unit 1020, and a processing unit 1030.

The receiving unit 1020 is configured to receive a first physical downlink control channel PDCCH sent by a network device, where the first PDCCH indicates a first time-frequency resource scheduled by the network device for the terminal device.

The receiving unit 1020 is configured to receive at least one piece of first posterior resource indication information sent by the network device, where the at least one piece of first posterior resource indication information indicates a reallocated time-frequency resource in the first time-frequency resource.

The processing unit 1030 is configured to control, based on the PDCCH and the at least one piece of first posterior resource indication information, the receiving unit 1020 to receive downlink data sent by the network device to the terminal device.

Based on the first PDCCH and the at least one piece of first posterior resource indication information that are sent by the network device, the terminal device in this embodiment of this application may determine whether there is at least one reallocated time-frequency resource in the first time-frequency resources, and determine the reallocated time-frequency resource in the first time-frequency resources. In this way, the terminal device may receive (for example, decode or demodulate) only data carried on at least one time-frequency resource that is not reallocated, and does not receive (for example, does not decode or does not demodulate) data carried on the reallocated time-frequency resource, to correctly receive downlink data. Therefore, receiving performance loss caused by resource reallocation can be reduced by using the terminal device in this embodiment of this application.

It should be noted that in this embodiment of this application, the sending unit 1010 may be implemented by a transmitter, the receiving unit 1020 may be implemented by a receiver, and the processing unit 1030 may be implemented by a processor.

Figure 14:
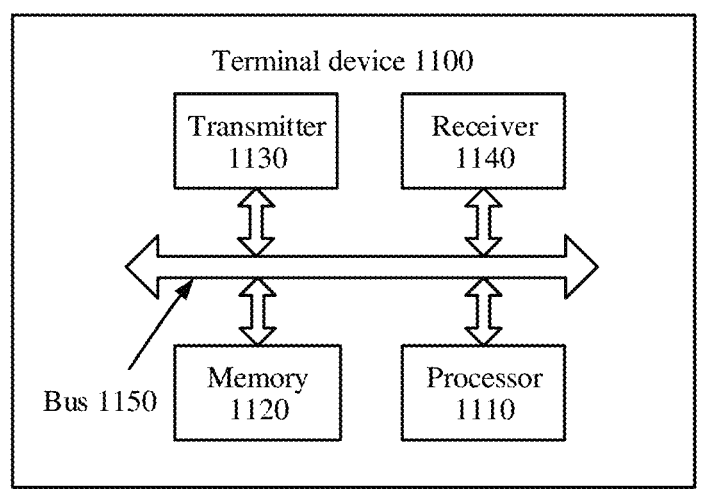
FIG. 14 is a schematic block diagram of a terminal device according to an embodiment of this application

As shown in FIG. 14, the terminal device 1100 may include a processor 1110, a memory 1120, a transmitter 1130, and a receiver 1140. The memory 1120 is configured to store an instruction, and the processor 1110, the transmitter 1130, and the receiver 1140 are configured to execute the instruction stored in the memory 1120, to control wireless communication.

Optionally, components in the terminal device 1100 may be coupled together by using a bus system 1150. In addition to a data bus, the bus system 1150 further includes a power bus, a control bus, and a status signal bus.

It should be noted that the foregoing method embodiments of this application may be applied to a processor, or implemented by a processor. The processor may be an integrated circuit chip and has a signal processing capability. In an implementation process, steps in the foregoing method embodiments can be implemented by using a hardware integrated logical circuit in the processor, or by using instructions in a form of software. The processor may be a general-purpose processor, a digital signal processor (DSP), an application-specific integrated circuit (ASIC), a field programmable gate array (FPGA), another programmable logic device, a discrete gate, a transistor logic device, or a discrete hardware component. The processor may implement or perform the methods, the steps, and logical block diagrams that are disclosed in the embodiments of this application. The general-purpose processor may be a microprocessor or the processor may be any conventional processor, or the like. The steps of the methods disclosed in the embodiments of this application may be directly performed and completed by a hardware decoding processor, or may be performed and completed by using a combination of hardware and software modules in the decoding processor. The software module may be located in a mature storage medium in the field, such as a random access memory, a flash memory, a read-only memory, a programmable read-only memory, an electrically-erasable programmable memory, or a register. The storage medium is located in a memory, and the processor reads information in the memory and completes the steps in the foregoing methods in combination with hardware of the processor.

It may be understood that the memory in the embodiments of this application may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. For example but not for limitation, many forms of RAMs are available, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). It should be noted that the memory in the system and method described in this specification aims to include but is not limited to these memories and any memory of another proper type.

It should be understood that the terminal device 1000 shown in FIG. 13 or the terminal device 1100 shown in FIG. 14 can implement processes implemented in the foregoing method embodiments. To avoid repetition, details are not described herein again.

In the terminal devices shown in FIG. 13 and FIG. 14, optionally, in an embodiment, the first time-frequency resources corresponds to at least one time domain scheduling unit in time domain, and each time domain scheduling unit includes at least one mini-slot, or each time domain scheduling unit includes at least one symbol.

Optionally, the at least one piece of first posterior resource indication information includes at least one piece of common posterior resource indication information, the at least one time domain scheduling unit is in a one-to-one correspondence with the at least one piece of common posterior resource indication information, an $I^{th}$ piece of common posterior resource indication information in the at least one piece of common posterior resource indication information is received by some or all of terminal devices scheduled in a time domain scheduling unit corresponding to the $I^{th}$ piece of common posterior resource indication information, each piece of common posterior resource indication information indicates a reallocated time-frequency resource in a corresponding time domain scheduling unit, $I \in [1, x]$, and x is a quantity of pieces of common posterior resource indication information.

Optionally, each piece of common posterior resource indication information is carried on the last M symbols in the corresponding time domain scheduling unit in time domain, and $M \geq 1$.

Optionally, a time-frequency resource used to carry the at least one piece of first posterior resource indication information is a reserved resource specified by a system.

Optionally, the first posterior resource indication information is specifically first dedicated posterior resource indication information, and the first dedicated posterior resource indication information indicates the reallocated time-frequency resource in the first time-frequency resource.

The processing unit 1030 or the processor 1110 is specifically configured to:

skip demodulating or decoding, based on the PDCCH and the first dedicated posterior resource indication information, data carried on the reallocated time-frequency resource.

Optionally, the first dedicated posterior resource indication information is carried on the last N symbols of the first time-frequency resource, and N≥1.

Optionally, a time-frequency resource used to carry the first dedicated posterior resource indication information is a time-frequency resource that is prohibited from being reallocated.

It should be understood that "one embodiment" or "an embodiment" mentioned in the whole specification means that particular features, structures, or characteristics related to the embodiment are included in at least one embodiment of this application. Therefore, "in one embodiment" or "in an embodiment" that appears throughout the whole specification does not necessarily mean a same embodiment. Moreover, the particular feature, structure, or characteristic may be combined in one or more embodiments in any proper manner.

It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

Persons of ordinary skill in the art may be aware that, in combination with the embodiments disclosed in this specification, the described method steps and units can be implemented by electronic hardware, computer software, or a combination thereof. To clearly describe interchangeability between the hardware and the software, the foregoing has generally described steps and compositions of each embodiment based on functions. Whether the functions are performed by hardware or software depends on particular applications and design constraint conditions of the technical solutions. Persons of ordinary skill in the art may use different methods to implement the described functions for each particular application, but it should not be considered that the implementation goes beyond the scope of this application.

It may be clearly understood by persons skilled in the art that, for the purpose of convenient and brief description, for a detailed working process of the described system, apparatus, and unit, refer to a corresponding process in the method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to a current system, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by persons skilled in the art within the technical scope disclosed in this application shall fall within the protection scope of this application. Therefore, the protection scope of this application shall be subject to the protection scope of the claims.

What is claimed is:

1. A method, comprising:
   receiving, by a terminal device, information on a first physical downlink control channel (PDCCH) from a network device, wherein the information on the first PDCCH indicates one or more first time-frequency resources allocated for the terminal device;
   receiving, by the terminal device, at least one piece of first posterior resource indication information from the network device, wherein the at least one piece of first posterior resource indication information indicates at least one reallocated time-frequency resource in the one or more first time-frequency resources, wherein the at least one reallocated time-frequency resource is a time-frequency resource that has been reallocated from the terminal device to another terminal device;
   receiving, by the terminal device according to the information on the first PDCCH and the at least one piece of first posterior resource indication information, downlink data from the network device; and
skipping demodulating or decoding, according to the information on the first PDCCH and the at least one piece of first posterior resource indication information, data carried on the at least one reallocated time-frequency resource.

2. The method according to claim 1, wherein before receiving, by the terminal device, the information on the first PDCCH from the network device, the method further comprises:
receiving, by the terminal device, first indication signaling from the network device, wherein the first indication signaling indicates at least one frequency domain resource that can be reallocated.

3. The method according to claim 1, wherein before receiving, by a terminal device, the information on the first PDCCH from the network device, the method further comprises:
receiving, by the terminal device, second indication signaling from the network device; and
determining, by the terminal device according to the second indication signaling, that the terminal device will receive the at least one piece of first posterior resource indication information.

4. The method according to claim 3, wherein the second indication signaling is received through Radio Resource Control (RRC) signaling.

5. The method according to claim 1, wherein the one or more first time-frequency resources correspond to at least one time domain scheduling unit in a time domain, and wherein:
each time domain scheduling unit in the least one time domain scheduling unit comprises at least one mini-slot; or
each time domain scheduling unit in the least one time domain scheduling unit comprises at least one Orthogonal Frequency Division Multiplexing (OFDM) symbol.

6. The method according to claim 5, wherein the at least one piece of first posterior resource indication information comprises at least one piece of common posterior resource indication information, the at least one time domain scheduling unit is in a one-to-one correspondence with the at least one piece of common posterior resource indication information, an $I^{th}$ piece of common posterior resource indication information in the at least one piece of common posterior resource indication information is received by one or more terminal devices scheduled in a time domain scheduling unit corresponding to the $I^{th}$ piece of common posterior resource indication information, each piece of common posterior resource indication information in the at least one piece of common posterior resource indication information indicates a reallocated time-frequency resource in a corresponding time domain scheduling unit, $I \in [1, x]$, and x is a total quantity of pieces of common posterior resource indication information in the at least one piece of common posterior resource indication information.

7. A terminal device, comprising:
a receiver;
a processor; and
a non-transitory computer-readable storage medium storing a program to be executed by the processor, the program including instructions to:
receive, via the receiver, information on a first physical downlink control channel (PDCCH) from a network device, wherein the information on the first PDCCH indicates one or more first time-frequency resources allocated for the terminal device;
receive, via the receiver, at least one piece of first posterior resource indication information from the network device, wherein the at least one piece of first posterior resource indication information indicates at least one reallocated time-frequency resource in the one or more first time-frequency resources, wherein the at least one reallocated time-frequency resource is a time-frequency resource that has been reallocated from the terminal device to another terminal device;
receive, according to the information on the first PDCCH and the at least one piece of first posterior resource indication information, via the receiver, downlink data from the network device; and
skip demodulating or decoding, according to the information on the first PDCCH and the at least one piece of first posterior resource indication information, data carried on the at least one reallocated time-frequency resource.

8. The terminal device according to claim 7, wherein the instructions further include instructions, when executed by the processor to case the receiver to:
receive first indication signaling from the network device, wherein the first indication signaling indicates a frequency domain resource that can be reallocated.

9. The terminal device according to claim 7, wherein the instructions further include instructions, when executed by the processor to case the receiver to:
receive second indication signaling from the network device; and
the instructions comprise further instructions to:
determine according to the second indication signaling, that the receiver will receive the at least one piece of first posterior resource indication information.

10. The terminal device according to claim 9, wherein the second indication signaling is received through Radio Resource Control (RRC) signaling.

11. The terminal device according to claim 7, wherein the one or more first time-frequency resources correspond to at least one time domain scheduling unit in a time domain, and wherein:
each time domain scheduling unit in the least one time domain scheduling unit comprises at least one mini-slot; or
each time domain scheduling unit in the least one time domain scheduling unit comprises at least one Orthogonal Frequency Division Multiplexing (OFDM) symbol.

12. The terminal device according to claim 11, wherein the at least one piece of first posterior resource indication information comprises at least one piece of common posterior resource indication information, the at least one time domain scheduling unit is in a one-to-one correspondence with the at least one piece of common posterior resource indication information, an $I^{th}$ piece of common posterior resource indication information in the at least one piece of common posterior resource indication information is received by one or more terminal devices scheduled in a time domain scheduling unit corresponding to the $I^{th}$ piece of common posterior resource indication information, each piece of common posterior resource indication information in the at least one piece of common posterior resource indication information indicates at least one reallocated time-frequency resource in a corresponding time domain scheduling unit, $I \in [1, x]$, and x is a total quantity of pieces of common posterior resource indication information in the at least one piece of common posterior resource indication information.

13. The terminal device according to claim 12, wherein each piece of common posterior resource indication information in the at least one piece of common posterior resource indication information is carried on the last M symbols in a corresponding time domain scheduling unit in the time domain, and M≥1.

14. The terminal device according to claim 7, wherein the at least one piece of first posterior resource indication information is first dedicated posterior resource indication information, and the first dedicated posterior resource indication information indicates the at least one reallocated time-frequency resource in the first time-frequency resources; and the instructions comprise further instructions to:
skip demodulating or decoding, according to the information on the first PDCCH and the first dedicated posterior resource indication information, data carried on the at least one reallocated time-frequency resource.

15. An apparatus, comprising:
at least one processor; and
a memory, wherein the memory stores a computer program, and the processor executes the computer program to perform the following operations:
receive, information on a first physical downlink control channel (PDCCH) from a network device, wherein the information on the first PDCCH indicates one or more first time-frequency resources allocated for the apparatus;
receiving, at least one piece of first posterior resource indication information from the network device, wherein the at least one piece of first posterior resource indication information indicates at least one reallocated time-frequency resource in the one or more first time-frequency resources, wherein the at least one reallocated time-frequency resource is a time-frequency resource that has been reallocated from the apparatus to another apparatus; and
receiving, according to the information on the first PDCCH and the at least one piece of first posterior resource indication information, downlink data from the network device; and
skipping demodulating or decoding, according to the information on the first PDCCH and the at least one piece of first posterior resource indication information, data carried on the at least one reallocated time-frequency resource.

16. The apparatus according to claim 15, wherein, the operations further comprise:
receiving, first indication signaling from the network device, wherein the first indication signaling indicates at least one frequency domain resource that can be reallocated.

17. The apparatus according to claim 15, wherein the operations further comprise:
receiving, second indication signaling from the network device; and
determining, according to the second indication signaling, that the apparatus will receive the at least one piece of first posterior resource indication information.

18. The apparatus according to claim 17, wherein the second indication signaling is received through Radio Resource Control (RRC) signaling.

19. The apparatus according to claim 16, wherein the one or more first time-frequency resources correspond to at least one time domain scheduling unit in time domain, and wherein:
each time domain scheduling unit in the at least one time domain scheduling unit comprises at least one mini-slot; or
each time domain scheduling unit in the at least one time domain scheduling unit comprises at least one Orthogonal Frequency Division Multiplexing (OFDM) symbol.

20. The apparatus according to claim 19, wherein the at least one piece of first posterior resource indication information comprises at least one piece of common posterior resource indication information, the at least one time domain scheduling unit is in a one-to-one correspondence with the at least one piece of common posterior resource indication information, an $I^{th}$ piece of common posterior resource indication information in the at least one piece of common posterior resource indication information is received by one or more terminal devices scheduled in a time domain scheduling unit corresponding to the $I^{th}$ piece of common posterior resource indication information, each piece of common posterior resource indication information in the at least one piece of common posterior resource indication information indicates a reallocated time-frequency resource in a corresponding time domain scheduling unit, I∈[1, x], and x is a total quantity of pieces of common posterior resource indication information in the at least one piece of common posterior resource indication information.

* * * * *